(12) United States Patent
Yakame et al.

(10) Patent No.: US 8,843,668 B2
(45) Date of Patent: Sep. 23, 2014

(54) INFORMATION PROCESSING DEVICE, CONNECTION METHOD AND STORAGE MEDIUM

(75) Inventors: Hirotaka Yakame, Kawasaki (JP); Akira Morita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 144 days.

(21) Appl. No.: 13/405,780

(22) Filed: Feb. 27, 2012

(65) Prior Publication Data

US 2012/0260004 A1  Oct. 11, 2012

(30) Foreign Application Priority Data

Apr. 8, 2011  (JP) ................................. 2011-086793

(51) Int. Cl.
*G06F 3/00* (2006.01)
*G06F 13/40* (2006.01)

(52) U.S. Cl.
CPC .................................. *G06F 13/409* (2013.01)
USPC ................................................. 710/17; 710/2

(58) Field of Classification Search
None
See application file for complete search history.

(56) References Cited

U.S. PATENT DOCUMENTS

| | | | |
|---|---|---|---|
| 6,009,492 A | 12/1999 | Matsuoka | |
| 7,262,961 B2 | 8/2007 | Motoe et al. | |
| 7,899,494 B2 | 3/2011 | Lee et al. | |
| 8,116,814 B2 | 2/2012 | Lee et al. | |
| 2006/0282594 A1* | 12/2006 | Motoe et al. | 710/301 |
| 2008/0152023 A1 | 6/2008 | Yoshida et al. | |
| 2010/0223416 A1* | 9/2010 | Ibarra et al. | 710/315 |

FOREIGN PATENT DOCUMENTS

| | | |
|---|---|---|
| CN | 101207768 | 6/2008 |
| EP | 1717910 A2 | 11/2006 |
| JP | 9-237141 | 9/1997 |
| JP | 2006-309771 | 11/2006 |
| WO | WO-2010-051281 A2 | 5/2010 |

OTHER PUBLICATIONS

Extended European Search Report dated Dec. 20, 2012 for corresponding European Application No. 12156958.6.
First Office Action dated Jan. 30, 2014 and the Search Report [hereinabove "CNOA"] issued by the State Intellectual Property Office of the P.R.C.(Chinese Patent Office) in the corresponding Chinese application No. 201210050489.4, with English-language translations.

* cited by examiner

*Primary Examiner* — Kris Rhu
(74) *Attorney, Agent, or Firm* — Fujitsu Patent Center

(57) ABSTRACT

To add an unpackaged interface without adding a new connector to an information processing device. An information processing device includes: a first control device connected, when first equipment is attached, to the equipment via a terminal train containing a first detection terminal; a second control device; and a connection control device detecting, when the second equipment is attached, a detection signal of the second equipment via the first detection terminal and connecting the second equipment to the second control device based on the detection signal.

12 Claims, 13 Drawing Sheets

INFORMATION PROCESSING DEVICE, CONNECTION METHOD AND STORAGE MEDIUM

CROSS-REFERENCE TO RELATED APPLICATIONS

This application is based upon and claims the benefit of priority of the prior Japanese Patent Application No. JP2011-86793, filed on Apr. 8, 2011, the entire contents of which are incorporated herein by reference.

FIELD

The present invention relates to a connection between an information processing device and equipment.

BACKGROUND

The information processing device such as a personal computer and a server includes interfaces for attaching a variety of equipment. Each of these interfaces normally includes an attaching unit, a connector and a control unit. The attaching unit is also called a bay or a slot and provides a space for installing the equipment. The connector on the side of the information processing device is also called a host-sided connector and connected to an equipment-sided connector serving as a partner connector. Electric signals or electric power are or is inputted and output between the information processing device and the equipment via the connectors. The control unit included in the interface controls the equipment received to the attaching unit by the electric signals inputted and output via the connectors under the management of a Central Processing Unit (CPU) etc. of the information processing device. This type of interface can be exemplified by a bay interface. The equipment connected to the bay interface will hereinafter be called a bay device. Further, the attaching unit, into which the bay device is attached, is referred to as a bay structure.

FIGS. 1 and 2 each illustrate a configuration of a conventional bay interface. FIG. 1 is a view illustrating a notebook type personal computer including a conventional bay structure, and a bay device. Further, FIG. 2 is a diagram illustrating the configuration of the conventional bay interface. The personal computer will hereinafter be abbreviated to PC.

As depicted in FIGS. 1 and 2, a PC 350 includes a bay structure 301. An optical drive, a hard disk, a battery, etc. can be exemplified as bay devices that can be inserted into and extracted from the bay structure 301. These devices illustrated in FIGS. 1 and 2 will hereinafter be referred to as a bay drive 302, a bay hard disk 303 and a bay battery 304. The bay structure 301 is also called an attaching unit to which a single bay device can be attached selectively from within plural types of bay devices.

Each of the bay drive 302 and the bay hard disk 303 includes an interface based on the Serial Advanced Technology Attachment (which is abbreviated to SATA and also called Serial ATA) standard. Then, a SATA-based connector 305 is packaged in each of the bay drive 302 and the bay hard disk 303. The SATA-based connector will hereinafter be simply termed the SATA connector. The bay drive 302 and the bay hard disk 303 are connected via SATA connectors 305 to the PC 350, and transmit and receive interface signals 309 as in FIG. 2. Further, a battery-standard connector 306 is packaged in the bay battery 304. The battery-standard connector will hereinafter be simply termed the battery connector. The bay battery 304 is connected via the battery connector 306 to the PC 350, and transmits and receives interface signals 311 in FIG. 2.

On the other hand, the PC 350, which has adaptability to the bay drive 302, the bay hard disk 303 and the bay battery 304, includes a mainboard 307 in an interior of its body. The SATA connectors 305 defined as a first connector and the battery connector 306 defined as a second connector are respectively packaged in the mainboard 307. Accordingly, when the bay drive 302 or the bay hard disk 303 is inserted into the bay structure 301, the bay drive 302 or the bay hard disk 303 establishes a connection with a SATA controller 308 on the mainboard 307 via the SATA connectors 305, thereby enabling the signals or electric power to be transferred and received. Further, when the bay battery 304 is inserted into the bay structure 301, the bay battery 304 establishes the connection with a battery controller 310 on the mainboard 307 via the battery connector 306, thereby enabling the signals or the electric power to be transferred and received.

[Patent document 1] Japanese Patent Application Laid-Open Publication No. 2006-309771

[Patent document 2] Japanese Patent Application Laid-Open Publication No. H09-237141

SUMMARY

One aspect of the technology of the disclosure is exemplified by an information processing device. The information processing device includes: a first control device to be connected, when first equipment is attached, to the equipment via a terminal train containing a first detection terminal; a second control device; and a connection control device to detect, when the second equipment is attached, a detection signal of the second equipment via the first detection terminal and to connect the second equipment to the second control device on the basis of the detection signal.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

A slot such as a bay structure of an information processing device has hitherto been provided with connectors based on standards such as SATA for a variety of interfaces. Then, each of a variety of equipment is utilized in the way of being connected to the information processing device by installing the equipment having the supportable (adaptable) connector into the slot.

In the conventional technology, however, in the case of supporting an unimplemented interface, it follows that a new connector is added to the information processing device. Then, the addition of the new connector causes a variety of problems such as increasing dimensions and a cost of the information processing device and requiring a time-consuming design for implementing the new connector. It is an aspect of the technology of the disclosure to provide a technology capable of supporting the unimplemented interface without adding a new connector and terminals to the information processing device.

An information processing device according to one embodiment will hereinafter be described with reference to the drawings. A configuration of the following embodiment is an exemplification, and the present information processing device is not limited to the configuration of the embodiment.
<First Working Example>

Figure 1:
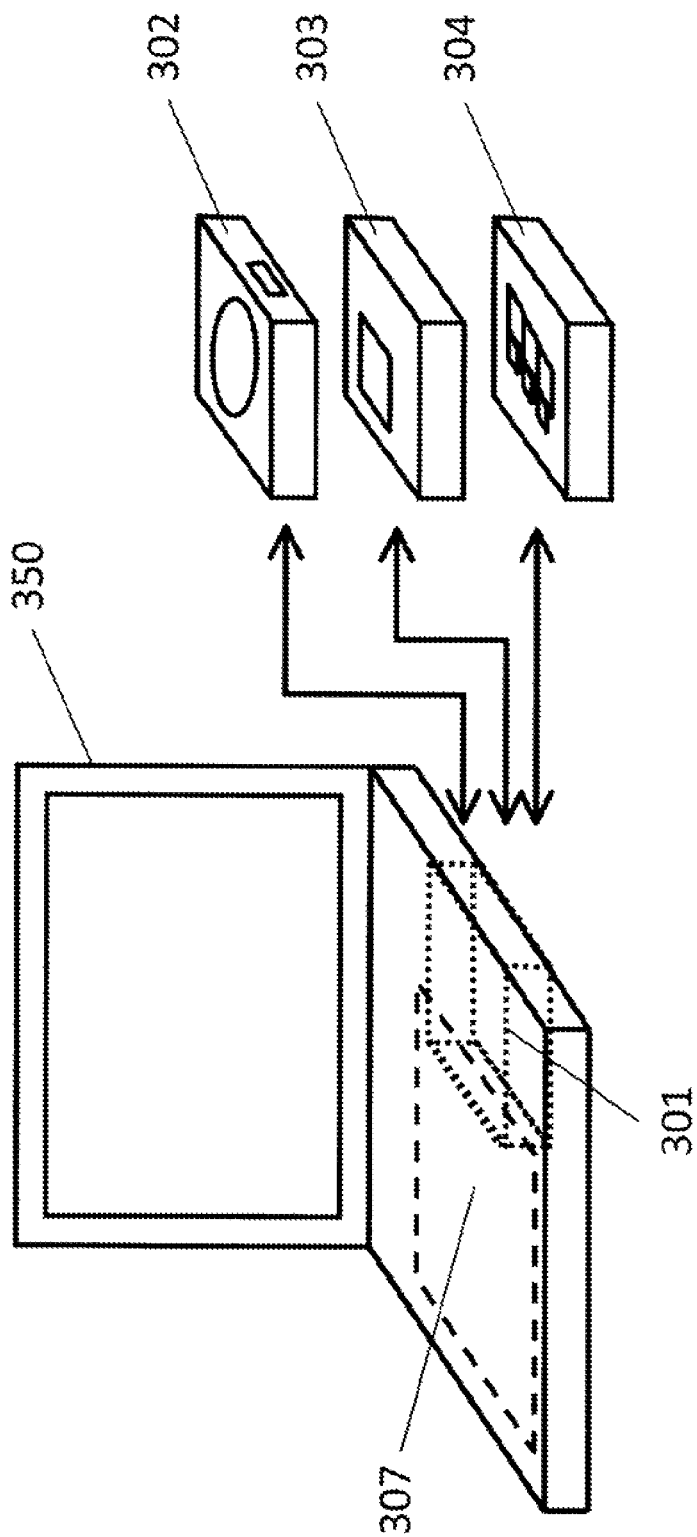
FIG. 1 is a view illustrating a notebook type personal computer including a bay structure, and a bay device.
Figure 2:
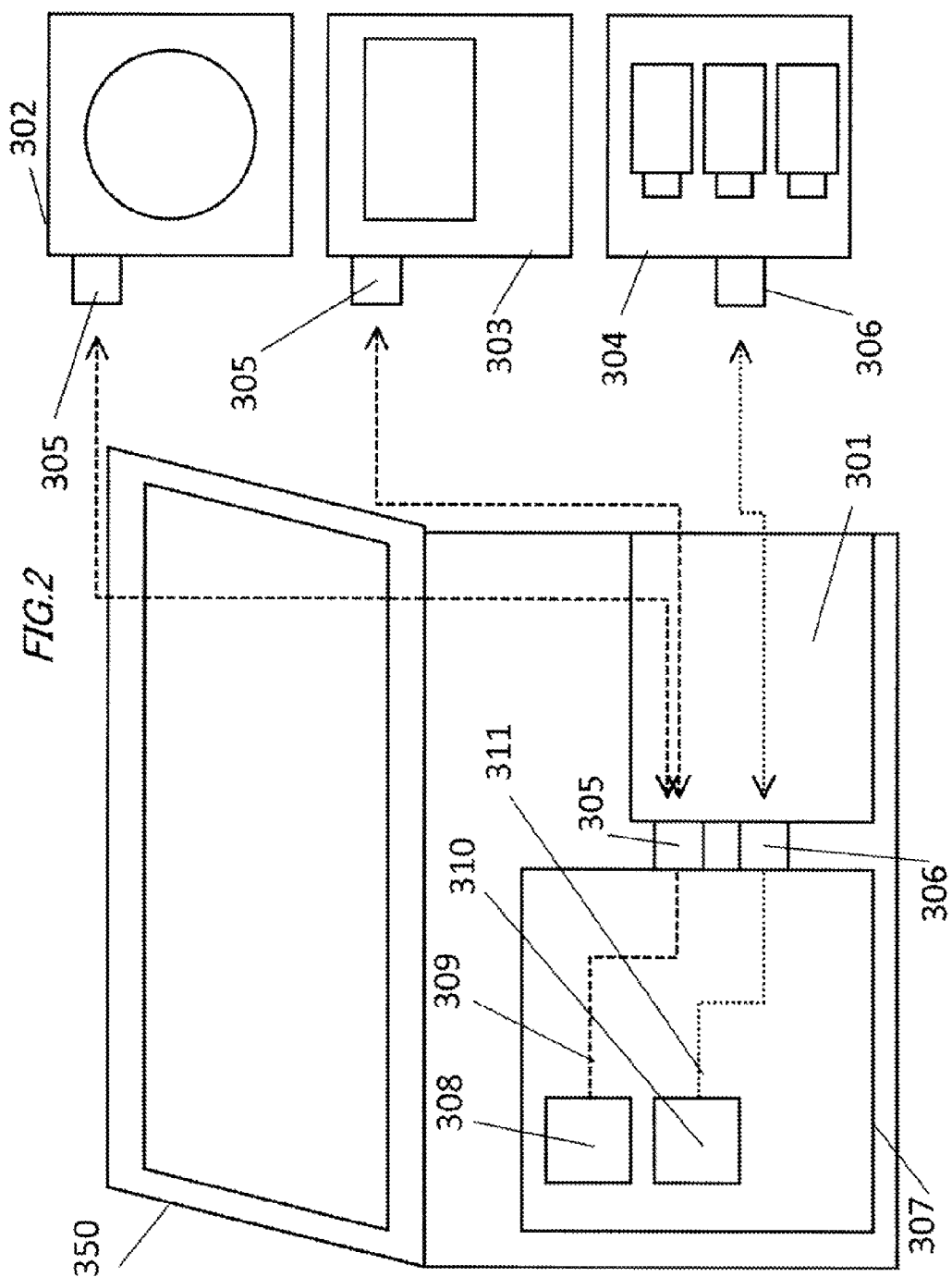
FIG. 2 is a diagram depicting a configuration of a bay interface.
Figure 3:
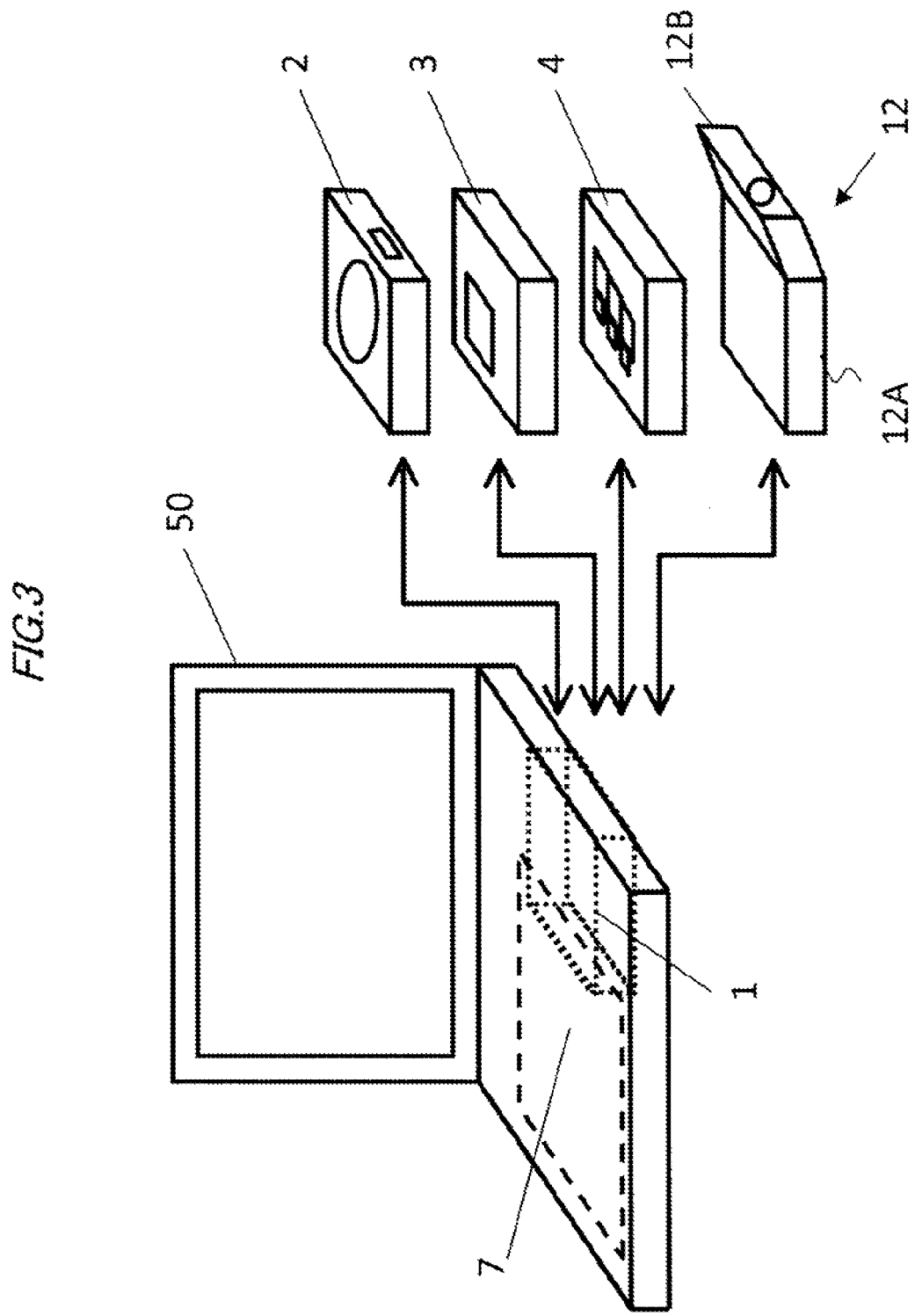
FIG. 3 is a view illustrating external configurations of the information processing device and pieces of equipment connectable to the information processing device.

The information processing device according to a first working example will hereinafter be described with reference to the drawings of FIGS. 3 through 11. FIG. 3 is a view illustrating external configurations of an information processing device 50 and pieces of equipment connectable to the information processing device 50. In FIG. 3, the information processing device 50 is exemplified as a notebook PC (Personal Computer). The information processing device 50 is not, however, necessarily limited to the notebook PC but may also be, e.g., a PDA (Personal Digital Assistant), a tablet PC, a mobile phone, a PHS (Personal Handy-phone System), a smartphone, a desktop PC, a server, etc.

The information processing device 50 includes a mainboard 7 and a bay structure 1 enabled to receive the equipment connected to the mainboard 7 in an interior of a housing. The mainboard 7 executes a variety of information processes, thereby providing functions of the information processing device. Further, the mainboard 7 is mounted with interfaces etc. to link up with the variety of equipment. On the other hand, the bay structure 1 is also called an attaching unit and is enabled to receive one piece of equipment selectively from within plural types of equipment. A plurality of equipment may, however, be attached to the bay structure 1.

FIG. 3 illustrates a bay drive 2, a bay hard disc 3, a bay battery 4 and a bay projector 12 as selectable pieces of equipment. For example, the bay drive 2 is an optical disk drive, the bay hard disc 3 is a hard disk drive, the bay battery 4 is a battery pack, and the bay projector 12 is a projector. The bay drive 2, the bay hard disc 3 and the bay battery 4 have approximately the same dimensions of their housings enabled to be attached to the bay structure 1. Further, the bay projector 12 includes a first housing 12A attached to the bay structure 1 and a second housing 12B connected to the first housing 12A in a way that gets a tilt adjustable by a hinge portion. The equipment installable into the bay structure 1 will hereinafter be referred to as a bay device. The bay battery 4 is one example of a first device. The bay projector 12 is one example of a second device.

The first housing 12A has built-in elements such as a projector control unit which adjusts brightness etc. of a light source and a connector or the like which connects the projector control unit to the mainboard 7 of the information processing device 50. On the other hand, the second housing 12B has a built-in optical system including the light source, lenses, etc. of the bay projector 12.

Figure 4:
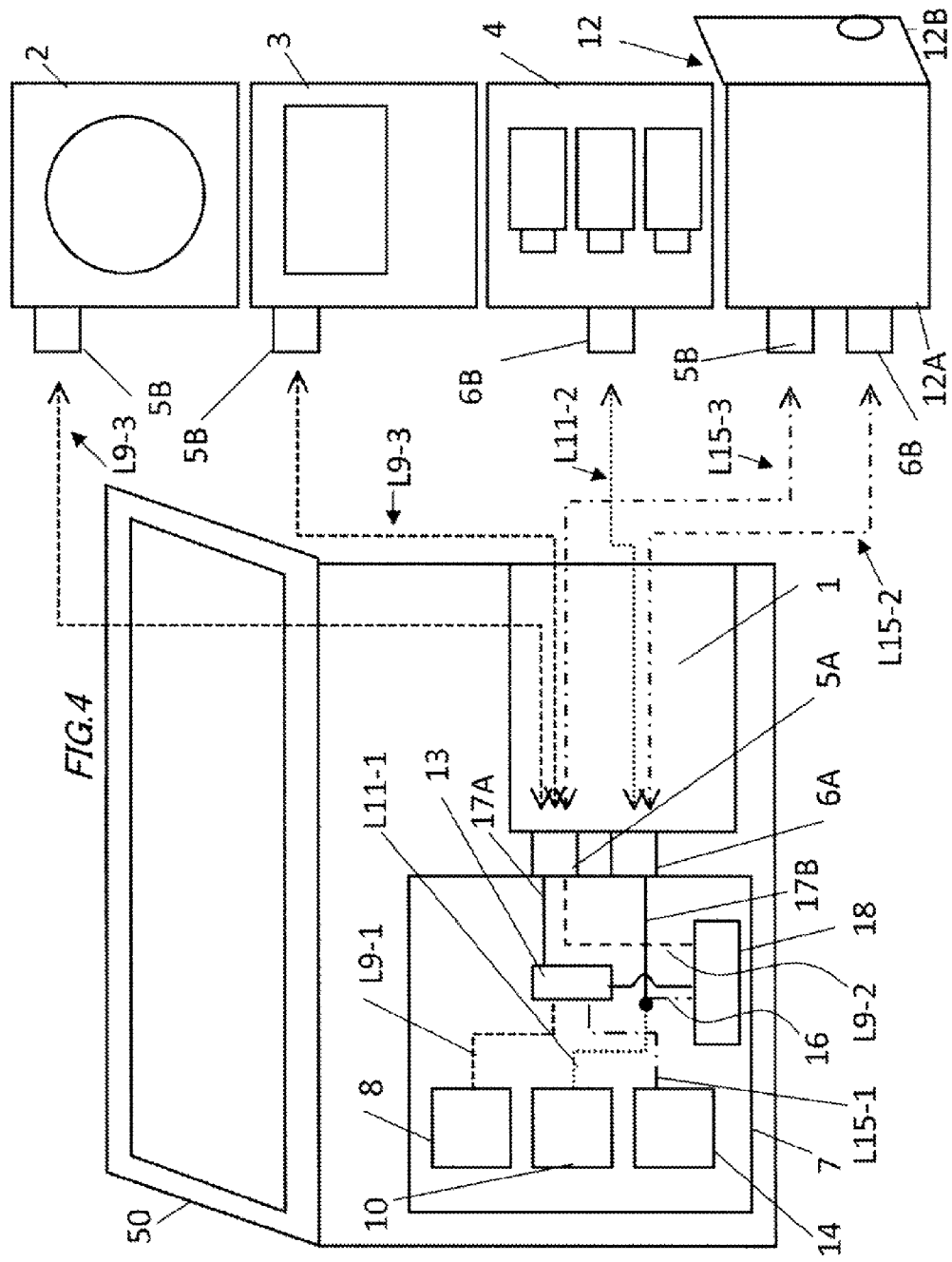
FIG. 4 is a diagram depicting the interfaces between the information processing device and the equipment.

FIG. 4 illustrates configurations of interfaces between the information processing device 50 and the variety of equipment. The mainboard 7 of the information processing device 50 is mounted with a variety of controllers such as a SATA controller 8, a battery controller 10 and a Universal Serial Bus (USB) controller 14. The battery controller 10 is one example of a first control device. Further, the USB controller 14 is one example of a second control device. Still further, the SATA controller 8 is one example of a third control device.

Moreover, the mainboard 7 is mounted with a SATA connector 5A on a host side and a battery connector 6A on the host side. Provided further on the mainboard 7 are a General Purpose Input/Output (GPIO) controller 18 and a switch 13 of which a connection is controlled by the GPIO controller 18. The GPIO controller 18 is one example of a connection control device. Then, the switch 13 connects each of terminals of the SATA connector 5A on the host side to the SATA controller 8 or the USB controller 14 in accordance with a control signal of the GPIO controller 18.

Furthermore, a terminal train of the battery connector 6A on the host side is connected to the battery controller 10. A bay projector signal line (which will hereinafter be simply referred to as the signal line) 17B serving also as a battery signal line connecting with one terminal of the battery connector 6A on the host side is, however, branched and is thereby connected to the battery controller 10 and the GPIO controller 18. That is, one branch line branching off from the signal line 17B is connected to the battery controller 10. Further, the other branch line branching off from the signal line 17B is connected to the GPIO controller 18. Namely, the signal line 17B connected to one terminal of the battery connector 6A on the host side has a role of transmitting an interface signal for the battery controller 10 and a role of transmitting the interface signal for the GPIO controller 18.

A bay projector detection signal 16 indicating whether the bay projector 12 is attached to the bay structure 1 or not, is transmitted via the branch line branching off from the signal line 17B to the GPIO controller 18. Note that the bay projector detection signal 16 is a signal (one-dotted chain line L15-2) that is output via the battery connector 6B on an equipment side from the bay projector 12. When the GPIO controller 18 is notified of the bay projector detection signal 16 and recognizes that the bay projector 12 is attached, the switch 13 connects terminals, diverted to the bay projector 12, of the terminal train of the SATA connector 5 to the USB controller 14 (one-dotted chain lines L15-1, L15-3).

On the other hand, when the bay drive 2 and the bay hard disk 3 are attached to the bay structure 1, the notification of the bay projector detection signal 16 is not given. In this case, in the information processing device 50 of the first working example, the GPIO controller 18, when further recognizing the connection of the SATA device from a SATA device detection signal (L9-2), gets the switch 13 to connect the terminal train of the SATA connector 5A entirely to the SATA controller 8 (broken lines L9-1, L9-3). The equipment, such as the bay drive 2 and the bay hard disk 3, which is connected to the information processing device 50 by the SATA standard, will hereinafter be called a SATA device. The SATA device is one example of third equipment.

Further, the GPIO controller 18, if unable to recognize both of the bay projector 12 and the SATA device, shuts down the switch 13.

The details of how the GPIO controller 18 switches over the switch 13 are given as follows. To be specific, the bay drive 2 and the bay hard disk 3 are provided with the SATA connectors 5B on the equipment side. Moreover, the bay battery 4 is provided with the battery connector 6B on the equipment side.

Accordingly, when attaching the bay drive 2 or the bay hard disk 3 into the bay structure 1, the SATA connector 5B on the equipment side is joined to the SATA connector 5A on the host side, whereby the terminal train within the equipment-sided SATA connector 5B is connected to the terminal train within the host-sided SATA connector 5A in a manner that enables the electric signals to be transmitted and received. The host-sided SATA connector 5A and the equipment-sided SATA connector 5B will, in the case of their being generically termed, hereinafter be referred to as the SATA connectors 5. The host-sided SATA connector 5A is one example of a second connector. Further, the equipment-sided SATA connector 5B is one example of a third equipment connector. The SATA connector 5 is one example of a connector which connects the third equipment to the third control device.

Similarly, when attaching the bay battery 4 into the bay structure 1, an equipment-sided battery connector 6B is joined to a host-sided battery connector 6A, and the terminal train within the equipment-sided battery connector 6B is connected to the terminal train within the host-sided battery connector 6A in a manner that enables the electric signals to be transmitted and received. The host-sided battery connector 6A and the equipment-sided battery connector 6B will, in the case of their being generically termed, hereinafter be referred to as the battery connectors 6. The host-sided battery connector 6A is one example of a first connector. Further, the equipment-sided battery connector 6B is one example of a first equipment connector.

Moreover, the bay projector 12 is provided with the equipment-sided SATA connector 5B and the equipment-sided battery connector 6B. Accordingly, when the first housing 12A of the bay projector 12 is attached to the bay structure 1, the equipment-sided SATA connector 5B is joined to the host-sided SATA connector 5A, and the equipment-sided battery connector 6B is joined to the host-sided battery connector 6A. Namely, the bay projector 12 can be connected to both of the host-sided SATA connector 5A and to the host-sided battery connector 6A via the equipment-sided SATA connector 5B and the equipment-sided battery connector 6B. The equipment-sided SATA connector 5B provided in the bay projector 12 is one example of a fourth equipment connector. The equipment-sided battery connector 6B provided in the bay projector 12 is one example of a second equipment connector.

Then, the bay projector 12 is connected to the USB controller 14 via the equipment-sided SATA connector 5B, the host-sided SATA connector 5A and the switch 13. On this occasion, the GPIO controller 18 detects the bay projector detection signal 16 through the equipment-sided battery connector 6B, the host-sided battery connector 6A and the branch line branching off from the signal line 17B. The branch line branching off from the signal line 17B and connecting with the GPIO controller 18 is used when the bay projector 12 is attached to the bay structure 1. Note that the branch line branching off from the signal line 17B and connecting with the battery controller 10 is employed when the battery controller 10 controls the bay battery.

The GPIO controller 18, when notified of the bay projector detection signal 16, controls the switch 13 to connect the terminals, diverted to the bay projector 12, of the terminal train of the host-sided SATA connector 5A to the USB controller 14 (one-dotted chain lines L15-1, L15-3).

The SATA device such as the bay drive 2 and the bay hard disk 3 is attached to the bay structure 1, in which case any equipment-sided connector is not connected to the host-sided battery connector 6A. Hence, the GPIO controller 18 neither detects the bay projector detection signal 16 nor recognizes the connection of the bay projector 12. The GPIO controller 18 is, however, notified of a SATA device detection signal (broken line L9-2) coming from the SATA device via the SATA connector 5A. As a result, the GPIO controller 18 recognizes the connection of the SATA device. Hereupon, the GPIO controller 18 gets the switch 13 to connect all of the terminals of the host-sided SATA connector 5A entirely to the SATA controller 8 (L9-1, L9-3).

Moreover, the bay battery 4 is attached to the bay structure 1, in which case the equipment-sided SATA connector 5B is not connected to the host-sided SATA connector 5A. In this instance, the host-sided SATA connector 5A comes to a disconnected status. Therefore, the GPIO controller 18 shuts down the switch 13 on the basis of the disconnected status of the host-sided SATA connector 5A. Further, when the bay battery 4 is attached, the GPIO controller 18 is notified of neither the SATA device detection signal nor the bay projector detection signal 16. In this case, in the first working example, the switch 13 comes to a shutdown status. On the other hand, the battery connector 6 is connected to the battery controller 10 (dotted lines L11-1, L11-2). Note that a solid line 17A represents a bay projector signal line serving also as a SATA signal line. Moreover, a solid line 17B represents a bay projector signal line serving also as a battery signal line.

Figure 5:
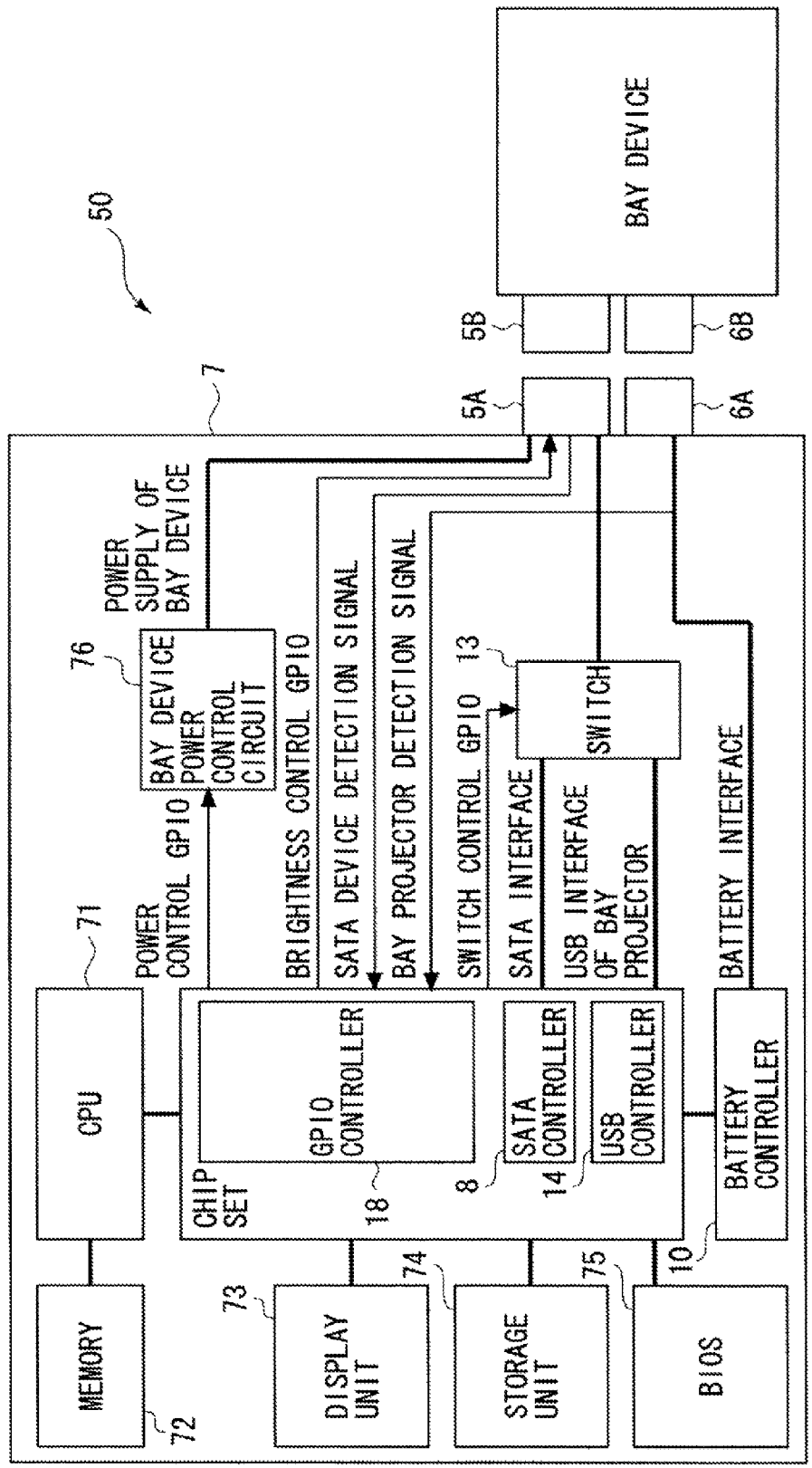
FIG. 5 is a diagram depicting a hardware configuration of the information processing device.

FIG. 5 illustrates a hardware configuration of the information processing device 50. The information processing device 50 includes, on the mainboard 7 within the housing, a CPU 71, a memory 72, a display unit 73, a storage unit 74, a Basic Input/Output System (BIOS) storage unit 75 such as a ROM (Read Only Memory), and a bay device power source control circuit 76. Further, the information processing device 50 includes, in a chipset on the mainboard 7, the SATA controller 8, the USB controller 14 and the GPIO controller 18. Still further, the information processing device 50 includes, on the mainboard 7, the battery controller 10, the switch 13, the host-sided SATA connector 5A and the host-sided battery connector 6A. Moreover, FIG. 5 illustrates the bay device including the equipment-sided SATA connector 5B and the equipment-sided battery connector 6B.

The CPU 71 executes a computer program loaded in an executable manner onto the memory 72 such as a RAM (Random Access Memory) or executes BIOS stored in the BIOS storage unit 75, thereby providing functions of the information processing device 50.

The memory 72, which is also called a main storage device, gets stored with the computer program executed by the CPU 71 or the data processed by the CPU 71. The display unit 73 receives the control signal from the CPU 71 via the chipset and displays the data on an unillustrated display device. The storage unit 74 is also called an external storage device and includes, e.g., the hard disk and the hard disk drive. The storage unit 74 may, however, be an SSD (Solid State Device) etc.

The BIOS connotes an aggregation of basic programs for controlling pieces of equipment peripheral to the information processing device 50. The BIOS provides the OS (Operating System) or the application programs with I/O functions etc. with respect to the peripheral pieces of equipment.

The SATA controller 8 within the chipset controls the bay devices connected via the switch 13 and the SATA connectors 5 (5A, 5B), i.e., controls the SATA-connected equipment such as the bay drive 2 and the bay hard disk 3 in FIGS. 3 and 4.

Further, the battery controller 10 controls the bay battery 4 illustrated in FIGS. 3 and 4 via the battery connector 6 (6A, 6B). The battery controller 10 determines whether the bay battery 4 is connected via, e.g. the battery connector 6 or not. Then, the battery controller 10 controls charge and discharge of the bay battery 4 and the power supply to the information processing device 50.

On the other hand, the USB controller 14, generally, controls the equipment connected by the USB. The equipment using a USB interface will hereinafter be termed a USB device. In the information processing device 50 in the first working example, however, the USB controller 14 is connected to the bay devices, e.g., the bay projector 12 and other pieces of equipment in FIGS. 3 and 4 via the switch 13 and the SATA connectors 5 (5A, 5B).

The GPIO controller 18 controls the bay devices, the switch 13, etc. that are connected via the SATA connectors 5 and the battery connectors 6. The GPIO controller 18 determines a type of the equipment connected as the bay device from the signal acquired via, e.g., the SATA connector 5 or the battery connector 6. The GPIO controller 18, if the device connected to the SATA connector 5 is, e.g., the SATA device, acquires the SATA device detection signal from the signal line of the SATA connector 5, and determines whether the SATA device is connected or not. Similarly, the GPIO controller 18, for instance, if the bay projector detection signal 16 is acquired from the signal line of the battery connector 6, determines that the bay projector 12 is connected as the bay device. Note that the GPIO controller 18 may, with respect to the USB devices other than the bay projector 12, determine from the bay projector detection signal 16 whether these USB devices are connected or not. Hence, the bay projector detection signal 16 may be called a USB device detection signal.

Then, the SATA devices such as the bay drive 2 and the bay hard disk 3 are connected as the bay devices, in which case the GPIO controller 18 gets the switch 13 to connect the SATA connector 5 to the SATA controller 8. Further, the USB device such as the bay projector 12 is connected as the bay device, in which case the GPIO controller 18 gets the switch 13 to connect the terminals, diverted as the USB, of the terminal train of the SATA connector 5 to the USB controller 14. Accordingly, through the detection of the bay device via the battery connector 6 and the switchover of the switch 13, the GPIO controller 18 makes a combination of the SATA connector 5 and the battery connector 6 function as the USB connector.

Moreover, the GPIO controller 18 controls a bay device power source control circuit 76 by use of a power source control GPIO signal, thereby supplying the power to the bay device via the SATA connector 5.

The mainboard 7 and the SATA devices (the bay drive 2, the bay hard disk 3, etc.) are connected to each other through the host-sided SATA connector 5A and the equipment-sided SATA connector 5B. Further, the mainboard 7 and the bay battery 4 are connected to each other via the host-sided battery connector 6A and the equipment-sided battery connector 6B. Still further, in the first working example, in addition to the SATA device and the bay battery, a new bay device is connected by employing the existing SATA connector 5 and battery connector 6. The new bay device can be exemplified by the USB device. The bay projector 12 illustrated in FIGS. 3 and 4 can be given as a typical example of the USB device. It does not, however, mean that the bay device to be newly connected is limited to the bay projector 12. For example, an air cleaner, a ten-key, a touchpad, a wireless communication interface, etc. can be exemplified as the new bay devices.

Figure 6:
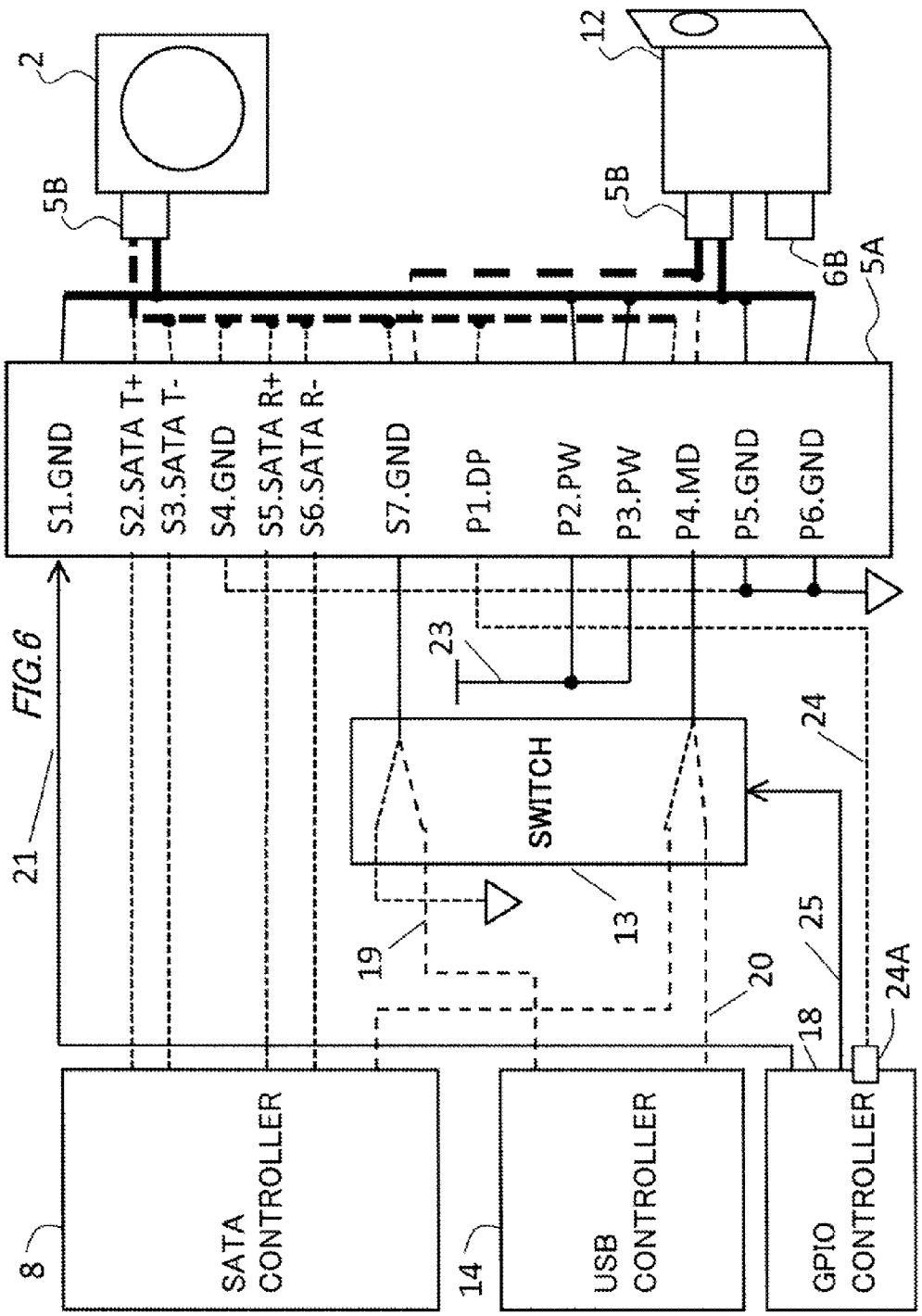
FIG. 6 is a diagram depicting signal paths of SATA connectors in the case of attaching a SATA device to a bay structure and in the case of attaching a device including a USB interface, a device detection signal and a brightness control signal thereinto.

FIG. 6 depicts signal paths of the SATA connectors 5 in the case of attaching the SATA device to the bay structure 1 and in the case of attaching the device having the USB interface, the device detection signal and the brightness control signal into the bay structure 1.

FIG. 6 explicitly illustrates types of the terminals contained in the terminal train in a manner that takes the host-sided SATA connector 5A for example. In the example of FIG. 6, the SATA connector 5 includes 13 pieces of terminals. Among these terminals, the terminal designated by S1-S7 are called signal segments and used mainly for transmitting and receiving the electric signals. Among the terminals S1-S7, the terminals S1, S4 and S7 are ground terminals. Further, the terminals S2 and S3 are, for example, a terminal pair of twisted pair lines for transmission differential signals that are transmitted to the equipment side (e.g., the bay drive 2) from the host side (e.g., the SATA controller 8). Conversely, the terminals S5 and S6 are, e.g., a terminal pair of the twisted pair lines for the reception differential signals that are transmitted to the host side from the equipment side. A connection example in FIG. 6 is that the terminals S2, S3, S5 and S6 are connected to the SATA controller 8 according to a normal connection specification.

Further, among 13-pieces of terminals of the host-sided SATA connector 5A, the terminals designated by P1-P6 are called power source segments and employed chiefly for supplying the power according to the SATA specification. Among the terminals P1-P6, the terminals P5 and P6 are ground terminals. The terminals P2 and P3 are power supply terminals (PW), in which, e.g., a power of +5v is supplied from a bay power source 23.

Moreover, the terminal P1 is called a terminal DP and used mainly for detecting the device according to the SATA specification. Namely, the terminal P1 is supplied with a SATA device detection signal 24 indicating whether the SATA device is connected or not from the equipment side (e.g., from the bay drive 2). To be specific, the terminal P1 is connected to a SATA device detection terminal 24A of the GPIO controller 18 and notifies the GPIO controller 18 of the SATA device detection terminal 24A. Furthermore, the terminal P4 is called a terminal MD and used mainly for a diagnosis when shipping a product according to the SATA specification.

In the first working example, in the case of connecting the host-sided SATA connector 5A to the USB controller 14, for instance, the terminal S7 is employed as a terminal USB+ (a broken line 19 in FIG. 6), i.e., a terminal on a positive side of the differential signal based on the USB specification. Further, the terminal P4 (the terminal MD) is used as a terminal USB− (a broken line 20 in FIG. 6), i.e., a terminal on a negative side of the differential signal based on the USB specification. Namely, the terminal S7 is connected in such a way that the switch 13 performs the switchover between a ground potential and the terminal USB+ of the USB controller 14. Still further, the terminal P4 (the terminal MD) is connected in such a manner that the switch 13 conducts the switchover between the terminal of the SATA controller 8 and the terminal USB− of the USB controller 14.

The switchover of the switch 13 is determined based on whether the SATA device such as the bay drive 2 or the USB device such as the bay projector 12 is attached to the bay structure 1 or not. Note that the determination as to whether the SATA device such as the bay drive 2 or the USB device such as the bay projector 12 is attached to the bay structure 1 or not, will be described later on by use FIG. 7.

Further, the terminal S1 (the ground terminal) is used for transmitting a brightness control GPIO signal 21 to the bay projector 12 from the GPIO controller 18. To be specific, in the example of FIG. 6, the equipment-sided SATA connector 5B of the bay projector 12 etc. is connected to the host-sided SATA connector 5A, in which case the terminal S1 is diverted to the GPIO controller 18. On the other hand, the terminal S7 (the ground terminal) and the terminal P4 (the terminal MD) are diverted to the USB controller 14.

It is to be noted that the interface of the USB device generally includes the ground terminal (GND), the power terminal (PW), the terminal USB+ and the terminal USB−. The bay projector 12 in the first working example further includes, in addition to the USB interface, a terminal for the brightness control GPIO signal 21 and a terminal for outputting the bay projector detection signal. In the first working example, the bay projector 12 diverts the terminals P5, P6 (the ground terminals), the terminal P2 (PW), the terminal S7 (the ground terminal) and the terminal P4 (the terminal MD) of the SATA connectors as the ground terminals (GND), the power terminal (PW) and the terminal USB+ and the terminal USB− as the USB interfaces. Moreover, the bay projector 12 diverts the terminal S1 (the ground terminal) of the SATA connector as the terminal for the brightness control GPIO signal 21. Note that as will be described in FIG. 7, the bay projector 12 diverts a terminal SC#/T− of the battery connector 6 as the terminal for outputting the bay projector detection signal.

In the information processing device 50, however, it does not mean that the connection between the host-sided SATA connector 5A and the USB controller 14 is limited to this type of connection. Namely, other terminals of the host-sided SATA connector 5A may be diverted to the connections with the terminals USB+ and USB−.

Figure 7:
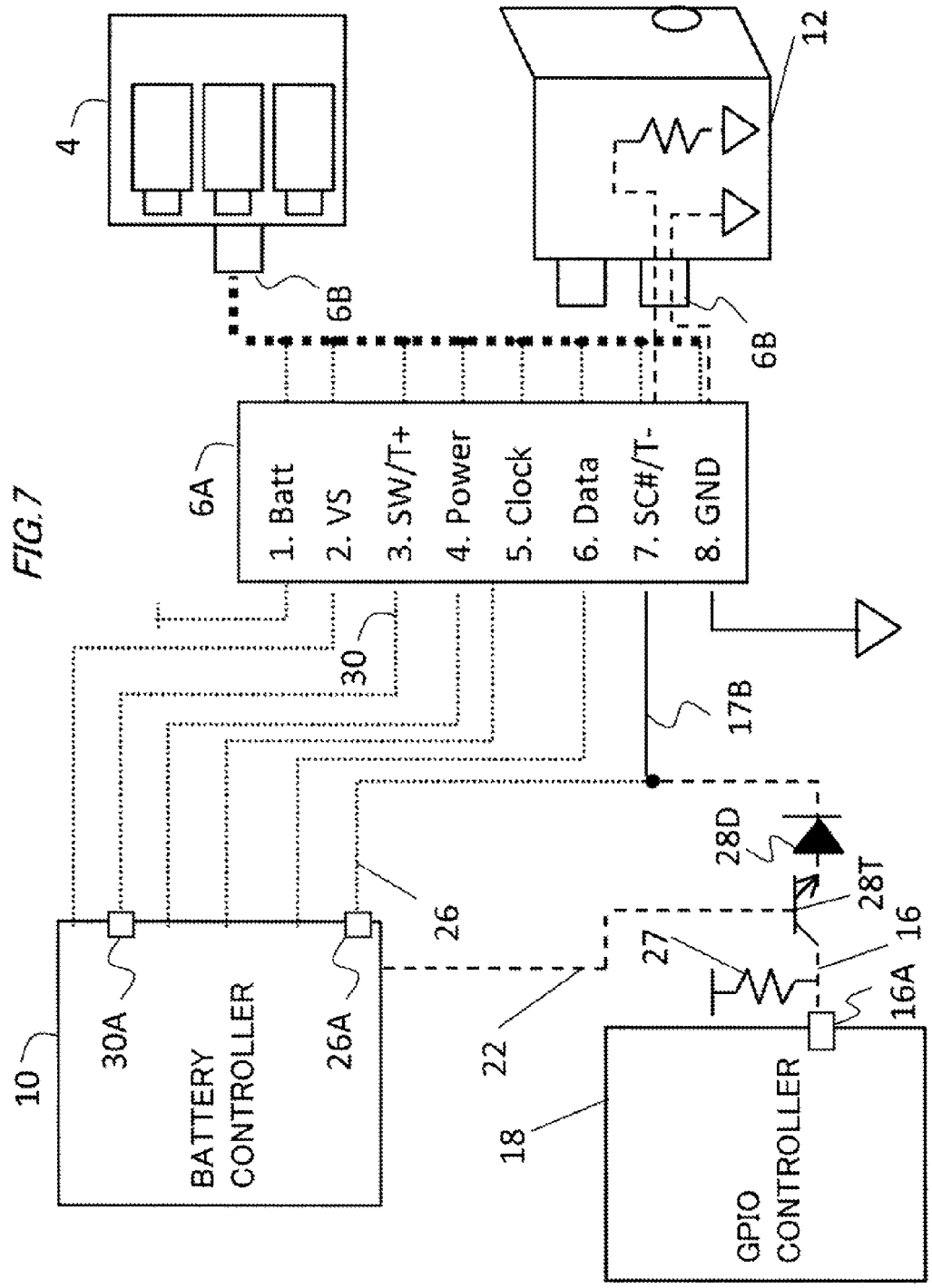
FIG. 7 is a diagram depicting signal paths of battery connectors in the case of installing a battery into the bay structure and in the case of attaching the device including the USB interface, the device detection signal and the brightness control signal thereinto.

FIG. 7 illustrates the signal paths of the battery connector 6 in the case of attaching the bay battery 4 to the bay structure 1 and in the case of attaching the device having the USB interface, the device detection signal and the brightness control signal into the bay structure 1.

FIG. 7 explicitly illustrates types of the terminals of the battery connector 6 in a way that takes the host-sided battery connector 6A for example. In the example of FIG. 7, the battery connector 6 includes 8-pieces of terminals. In FIG. 7, a first terminal of the battery connector 6A is denoted by Batt. The terminal Batt is a power supply terminal between the information processing device 50 and the bay battery 4. A terminal VS defined as a second terminal is an output terminal of a signal for discerning whether the bay battery 4 excessively discharges the electricity or not. A terminal SW/T+ defined as a third terminal is a detection signal terminal of the bay battery 4. For example, when the bay battery 4 is connected to the host-sided battery connector 6A via the battery connector 6B on the side of the bay battery 4, the terminal SW/T+ outputs, to the information processing device 50, a predetermined bay battery detection signal 30, e.g., a low electric potential L (equal to or lower than a reference value) or a high electric potential H (equal to or higher than the reference value). As in FIG. 7, the bay battery detection signal 30 is output to a bay battery detection terminal 30A of the battery controller 10 via the terminal SW/T+ of the battery connector 6.

A terminal Power defined as a fourth terminal is a power supply terminal for the ROM within the bay battery 4. A terminal Clock defined as a fifth terminal is a CLK (Clock) signal terminal between the ROM within the bay battery 4 and the battery controller 10. A terminal Data defined as a sixth terminal is a terminal of signals DATA for transmitting and receiving a variety of data between the ROM within the battery and the battery controller 10. A terminal SC#/T− defined as a seventh terminal is a control signal terminal which gives a charge/discharge enabled/disabled instruction to the bay battery 4. A terminal GND defined as an eighth terminal is a terminal which is grounded on the side of the information processing device 50 and supplies the ground potential to the bay battery 4.

By the way, the bay projector 12 uses a large amount of current as compared with the bay drive 2 and the bay hard disk 3. Further, a Video Graphics Array (VGA) controller and a Video Random Access Memory (VRAM) are packaged in the bay projector 12. Consequently, the bay projector 12 uses great quantities of high-speed signals and clocks and is therefore also a noise source causing a large quantity of unnecessary radiations. It is desirable for reducing these large noises that a frame becoming the ground potential of the bay projector 12 is fixed to the ground potential on the side of the information processing device 50. There is, however, a constraint on a structure named the bay device which insertion and extraction are required of, and such a ground path strengthening method is not appropriate that the frame of the bay projector 12 is screwed to the information processing device 50.

The connection to the bay projector 12 via the SATA connector 5 can ensure the ground path for the ground terminal of the SATA connector 5. There could, however, be a case in which conductance of the ground path for the ground terminal of the SATA connector 5 is not sufficient for the device like the bay projector 12.

Such being the case, as depicted in FIG. 7, the bay projector 12 is provided with the battery connector 6 in addition to the SATA connector 5, thereby enabling the conductance of the ground path to be improved. The ground path of the battery connector 6 is an example of a ground conducting path of a first connector. The terminal GND of the battery connector 6 may be brought into contact with a frame GND of the bay projector 12 within the bay projector 12. The terminal GND of the battery connector is originally designed on the assumption of the large amount of current, and the ground potential is well stabilized. Then, the terminal GND of the battery connector 6 is brought into contact with the frame GND of the bay projector 12 within the bay projector 12, whereby the radiant noises caused when operating the bay projector 12 can escape to the side of the mainboard 7 of the information processing device 50 via the frame GND and the terminal GND of the battery connector 6. Consequently, this can facilitate the escape of the radiant noises caused in the bay projector 12 to the ground potential. Accordingly, the battery connector 6, which is the connector having the large conductance of the path to the ground potential, is used in the bay projector 12, thereby enabling the path leading to the further stable ground potential to be ensured other than the SATA connector 5. Hence, the more stabilized ground potential can be supplied.

In the first working example, a signal line 17B connected to a seventh terminal SC#/T− branches off and is thereby connected to a SC#/T− signal terminal 26A of the battery controller 10 and to a bay projector detection signal terminal 16A of the GPIO controller 18.

In these signal terminals, the SC#/T− signal terminal 26A of the battery controller 10, upon detecting the connection of the battery via a terminal SW/T+ of the battery connector 6 (6A, 6B), outputs a signal SC#/T−. The signal SC#/T− is a single (a dotted line 26 in FIG. 7) for controlling the bay battery 4. On the other hand, when the connection of the battery is not detected via the terminal SW/T+ of the battery connector 6 (6A, 6B), the SC#/T− signal terminal 26A of the battery controller 10 comes to a high potential H.

On the other hand, the projector detection signal terminal 16A of the GPIO controller 18 is pulled up to the power source through an external pull-up resistance 27. Moreover, the projector detection signal terminal 16A is connected to the branch line of the signal line 17B via a transistor 28T functioning as a switch and a diode 28D. FIG. 7 illustrates a bipolar transistor by way of the transistor 28T.

A bay battery detection signal 22 output from the battery controller 10 is output to a base terminal of the transistor 28T. The battery controller 10, upon detecting the connection of the bay battery 4 via the terminal SC#/T+ of the battery connector 6, sets the bay battery detection signal 22 to a low electric potential (e.g., the ground potential). Accordingly, when the connection of the bay battery 4 is detected, the transistor 28T comes to the shutdown status. As a result, the high electric potential H is inputted via the external pull-up resistance 27 to the projector detection signal terminal 16A of the GPIO controller 18. The high electric potential H is, among binary signals processed in the digital circuit within the information processing device 50, the signal exhibiting the higher electric potential than a predetermined reference value and may also be, e.g., the power supply potential.

On the other hand, the battery controller 10, when detecting a non-connection of the bay battery 4 via the terminal SC#/T+ of the battery connector 6, sets a bay battery detection signal 22 to the high electric potential (e.g., the power supply potential). Thereupon, the transistor 28T is switched ON, and the bay projector detection signal 16 can be inputted to the GPIO controller 18 via the diode 28D and the terminal SC#/T−.

The circuit within the bay projector 12 connected to the terminal SC#/T− of the battery connector 6B is pulled down to the ground potential via the pull-down resistance. Therefore, the bay projector 12 is attached to the bay structure 1, and the battery connector 6B of the bay projector 12 is connected to the host-sided battery connector 6A, at which time the GPIO controller 18 is notified of the signal of the pulled-down electric potential via the transistor 28T and the diode 28D. To be specific, the pull-down electric potential within the bay projector 12 is inputted to the projector detection signal terminal 16A from the terminal SC#/T− of the battery connector 6. Accordingly, the signal varying to the pull-down electric potential via the terminal SC#/T− is inputted as the bay projector detection signal 16 to the projector detection signal terminal 16A from the high electric potential via the pull-up resistance 27. The bay projector detection signal 16 is one example of a detection signal of the second equipment. Further, the terminal SC#/T− of the battery connector 6 is one example of a first detection terminal.

With this bay projector detection signal 16, the GPIO controller 18 detects the reception of the bay projector 12 to the bay structure 1 and the connection of the interface of the bay projector 12 including the SATA connector 5 and the battery connector 6. Then, the GPIO controller 18 switches over the switch 13 by a switch control GPIO signal 25 illustrated in FIG. 6, thus connecting the ground terminal S7.GND and the terminal P4.MD of the SATA connector 5 respectively to the terminal USB+ and the terminal USB− of the USB controller 14. Furthermore, the GPIO controller 18 outputs the brightness control GPIO signal 21 to the bay projector 12 from the SATA connector 5 via the terminal S1 (the original ground terminal).

Figure 8:
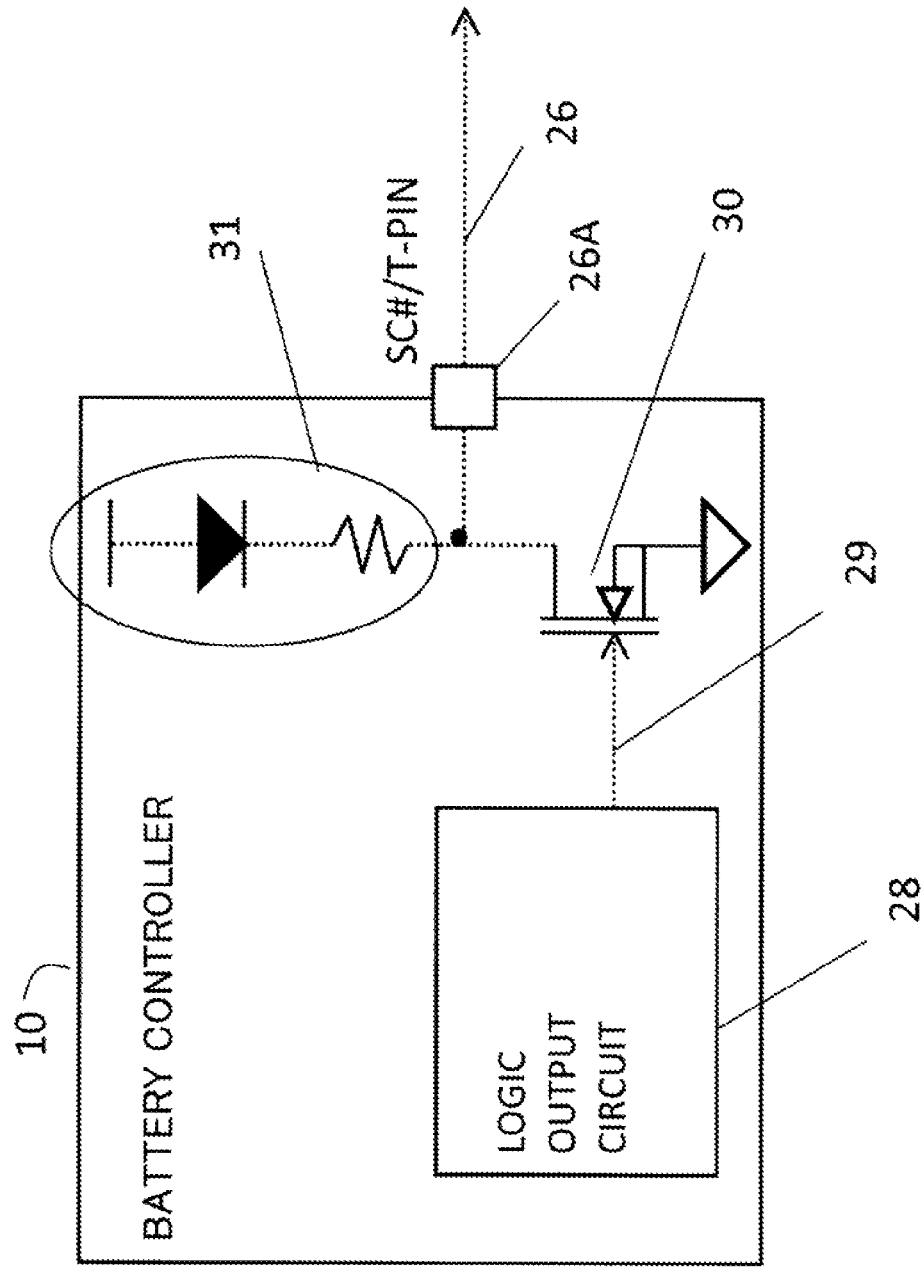
FIG. 8 is a diagram depicting a configuration of an internal circuit of a battery controller.

FIG. 8 illustrates a configuration of an internal circuit of the battery controller 10 connected to the SC#/T− signal terminal 26A. The internal circuit in FIG. 8 includes, e.g., an N-channel Field Effect Transistor (FET; field effect transistor) 30, a built-in pull-up circuit 31 which pulls up a drain of the FET 30 and a logic output circuit 28 which controls a gate of the FET 30. Then, the SC#/T− signal terminal 26A is connected to the drain of the FET 30.

The built-in pull-up circuit 31 takes a configuration in which a diode connected in a forward direction to the FET 30 from a power supply voltage and a pull-down resistance are connected in series. There is no limit to the connecting sequence of the diode and the pull-down resistance.

The logic output circuit 28 generates the signal SC#/T− by a bay battery charge/discharge control signal 29. Namely, the logic output circuit 28, if the bay battery 4 may charge or discharge the electricity, outputs the high electric potential H by way of the bay battery charge/discharge control signal 29. The high electric potential H is an electric potential for switching ON, e.g., the power supply potential or the FET 30. On the other hand, the logic output circuit 28, if the bay battery 4 is inhibited from charging or discharging the electricity, outputs a low electric potential L byway of the bay battery charge/discharge control signal 29. The low electric potential L is an electric potential for switching OFF, e.g., the ground potential or the FET 30.

A source of the FET 30 is grounded, and hence, when the FET 30 is switched ON, the SC#/T− signal terminal 26A outputs the signal L (or the ground potential). With this signal L, the battery controller 10 notifies the bay battery 4 via the battery connector 6 that this is a case in which the bay battery 4 may charge or discharge the electricity.

On the other hand, when the FET is switched OFF, with the built-in pull-up circuit 31, the SC#/T− signal terminal 26A outputs the signal H (or the power supply potential). With this signal H, the battery controller 10 notifies the bay battery 4 via the battery connector 6 that this is a case where the bay battery 4 is inhibited from charging or discharging the electricity.

Note that the battery controller 10, it may be sufficient, controls the logic output circuit 28 to output the low electric potential L even in such a case that the bay battery detection signal 30, of which the bay battery detection terminal 30A of the battery controller 10 is notified via the SW/T+ terminal depicted in FIG. 7, informs of the non-connection of the bay battery. That is, even when the bay battery 4 is not attached to the bay structure 1, it may be sufficient that the FET 30 is switched OFF.

Hereupon, as described above, the SC#/T− signal terminal 26A, by dint of the built-in pull-up circuit 31, becomes the high electric potential H via the diode in the forward direction and the resistance. Each of resistance constants of the pull-up resistance of the built-in pull-up circuit 31 and the external pull-up resistance 27 is, however, well larger than a resistance constant of the pull-down resistance within the bay projector 12, and hence, when the bay projector 12 is attached to the bay structure 1, the pull-down resistance within the bay projector 12 overcomes the pull-up resistance of the built-in pull-up circuit 31 and the external pull-up resistance 27. As a result, the projector detection signal terminal 16A of the GPIO controller 18 can, as illustrated in FIG. 7, detect the signal varying to the pull-down potential via the terminal SC#/T− from the high electric potential via the pull-up resistance 27 and the built-in pull-up circuit 31 (FIG. 8) of the battery controller 10.

Figure 9:
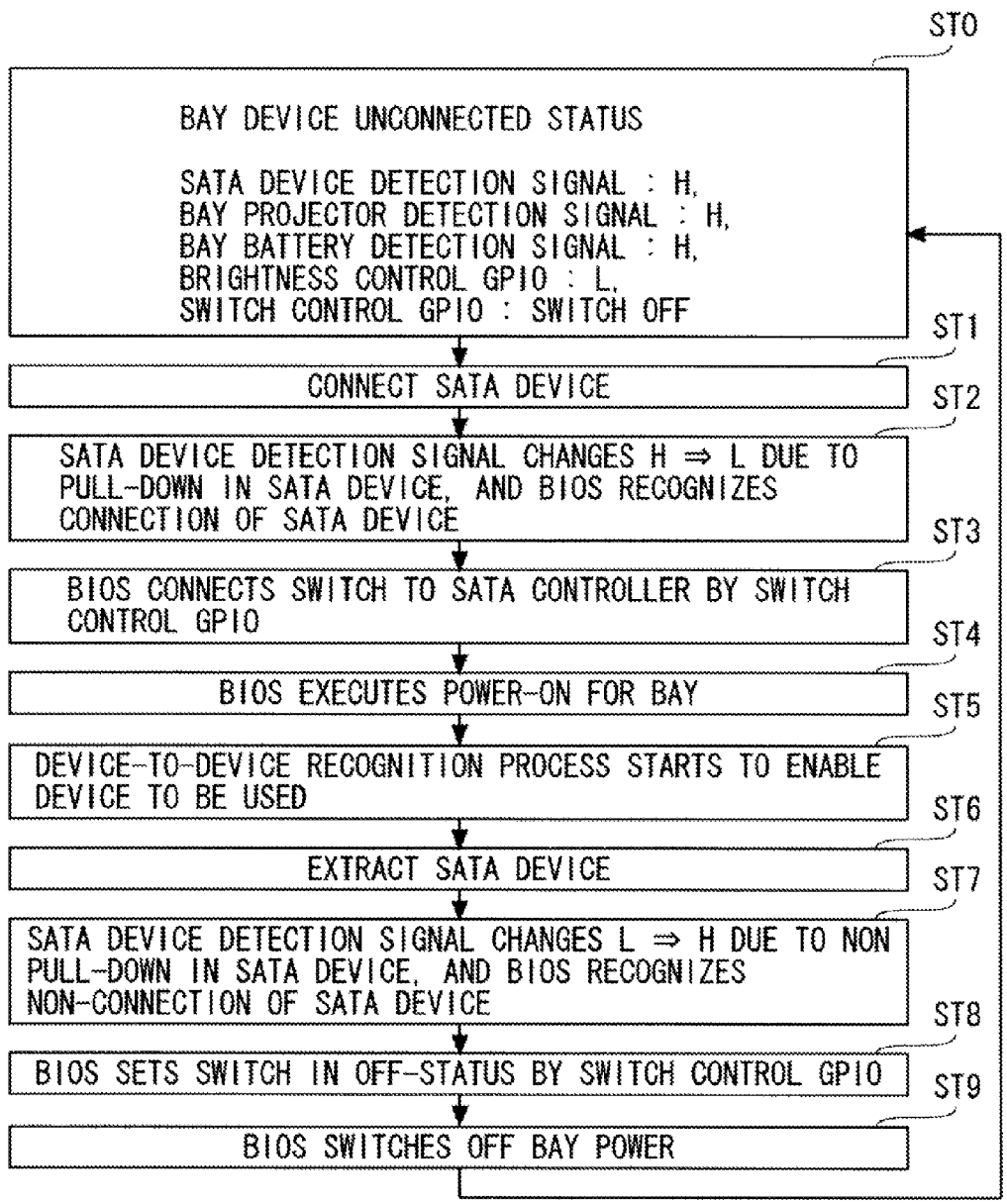
FIG. 9 is a flowchart illustrating processes of the information processing device in the case of connecting the SATA device.

FIG. 9 illustrates processes of the information processing device 50 in the case of connecting the SATA device through the bay structure 1. The processes in FIG. 9 are executed by the CPU 71 of the information processing device 50 on the basis of a computer program deployed in an executable manner on the memory 72 or BIOS etc. stored in the ROM etc. In the following discussion, the CPU 71 performs processing by executing the BIOS, in which case this is simply referred to as "the BIOS performs processing".

In FIG. 9, a symbol "ST0" represents a status of the information processing device 50 before starting the process. An assumption in the example of FIG. 9 is that the bay device is not yet connected to the information processing device 50. Accordingly, the terminal DP, which outputs the SATA device detection signal, is in the disconnected status. Herein, it is assumed that a SATA device detection signal terminal 24A (see FIG. 6), connected to the terminal DP, of the GPIO controller 18 is pulled up by the pull-up circuit in the same way as the bay projector detection signal terminal 16A depicted in FIG. 7 is pulled up. Then, when the terminal DP is in the disconnected status, the SATA device detection signal terminal 24A of the GPIO controller 18 comes to the high electric potential H.

Similarly, the terminal SW/T+ of the battery connector 6 which detects the bay battery is in the disconnected status. Herein, a presumption is that the bay battery detection terminal 30A (see FIG. 7) of the battery controller 10, to which the terminal SW/T+ of the battery connector 6 is connected, is pulled up by the pull-up circuit in the same way as the projector detection signal terminal 16A illustrated in FIG. 7 is pulled up. Hereupon, when the terminal SW/T+ is in the disconnected status, the bay battery detection terminal 30A of the battery controller 10 becomes the high electric potential H.

Since the terminal SW/T+ of the battery connector 6 is at the high electric potential H, the bay battery detection signal 22, which is output from the battery controller 10, becomes the high electric potential H. Accordingly, the transistor 28T in FIG. 7 is switched ON, however, the host-sided battery connector 6A is in the disconnected status. Therefore, the high electric potential H is inputted via the external pull-up resistance 27 to the bay projector detection signal terminal 16A of the GPIO controller 18. At this time, the GPIO controller 18 sets the brightness control GPIO signal 21 to the low electric potential L. Further, the GPIO controller 18 switches OFF (shutdown status) the switch 13 by a switch control GPIO signal 25.

In the status described above, it is assumed that the user will have inserted the SATA device such as the bay drive 2 and the bay hard disk 3 into the bay structure 1 (ST1). Then, it is feasible to transmit and receive the signals and to supply the power between the bay device and the information processing device 50 via the SATA connector 5. As a result, the SATA device detection signal (the terminal DP) changes to the low electric potential L from the high electric potential H by the pull-down circuit within the SATA device. Hereupon, the BIOS recognizes the connection of the SATA device from the signal of which the SATA controller 8 notifies the CPU 71 (ST2).

Next, the BIOS connects the switch 13 to the SATA controller by the switch control GPIO signal 25 (ST3). As a result, the ground terminal S7 of the host-sided SATA connector 5A is grounded as usual. Further, the terminal P4.MD is connected to the SATA controller 8 as usual. Next, the BIOS executes power activation on the bay via the power supply terminals P2, P3 (PW) of the SATA connector 5 (ST4). Thereupon, a recognition process is started between the information processing device 50 and the SATA device. More specifically, the information is transmitted and received between the information processing device 50 and the SATA device via the terminals S2.SATA+ and S3.SATA− and the terminals S5.SATA R+ and S6.SATA R−. As a result, the user is enabled to use the SATA device (ST5).

Subsequently, it is assumed that the user will have extracted the SATA device out of the bay structure 1 (ST6). Then, the pull-down circuit within the SATA device gets disconnected, whereby the SATA device detection signal changes to the high electric potential H from the low electric potential L. As a consequence, the BIOS recognizes the non-connection of the SATA device (ST7). Hereupon, the BIOS switches OFF (shutdown status) the switch 13 by the switch control GPIO signal 25 (ST8). Further, the BIOS cuts OFF the supply of the bay power (ST9). Resultantly, the information processing device 50 returns to the status in ST0.

Figure 10:
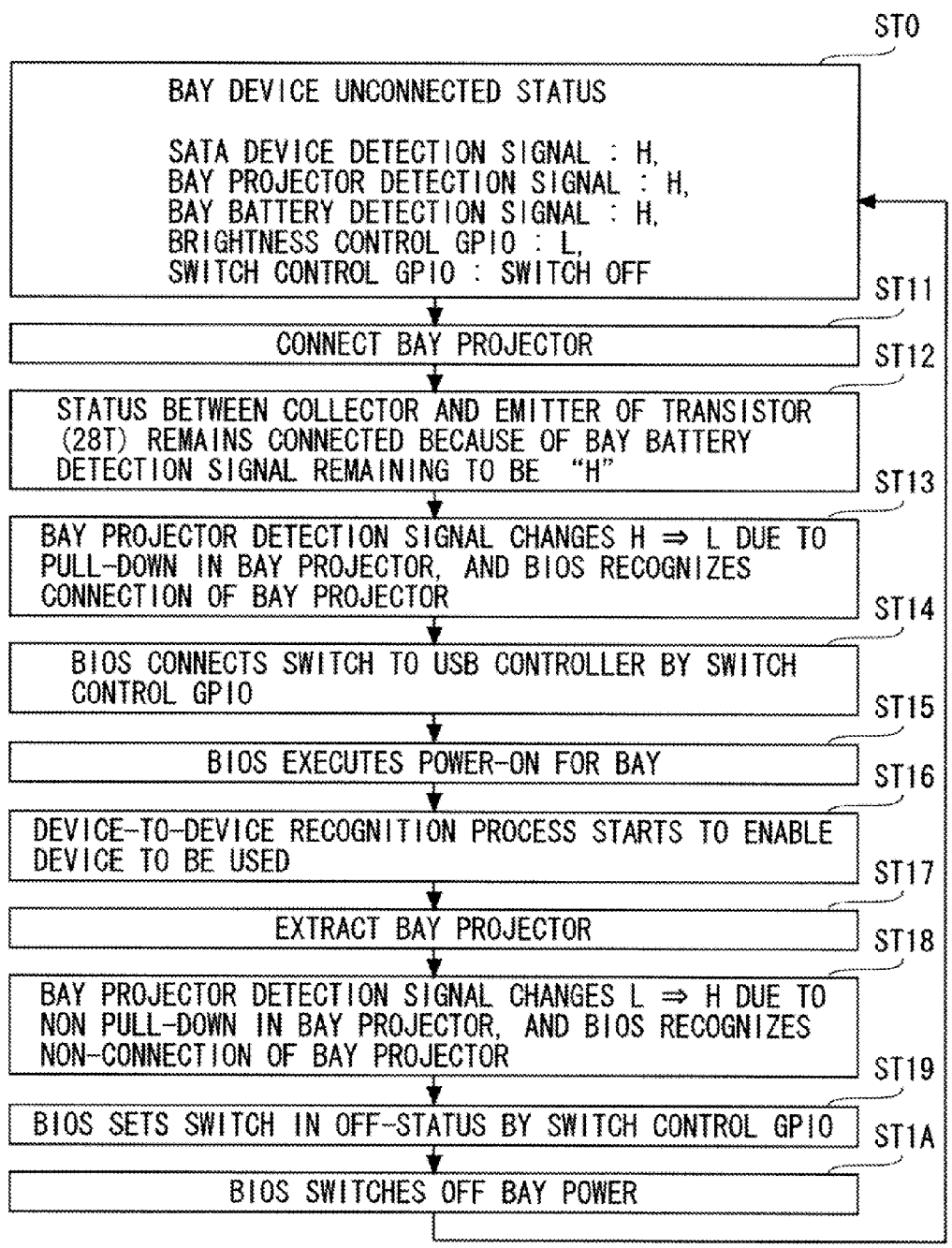
FIG. 10 is a flowchart illustrating processes of the information processing device in the case of connecting a bay projector.

FIG. 10 illustrates the processes of the information processing device 50 in the case of connecting the bay projector 12 through the bay structure 1. The status in S0 of FIG. 10 is the same as in the case of FIG. 9. In this status, an assumption is that the user will have inserted the bay projector 12 into the bay structure 1. Then, the bay projector 12 is connected to the information processing device 50 via the SATA connector 5 and the battery connector 6 (ST11). Namely, it is feasible to transmit and receive the signals and to supply the power between the bay projector 12 and the information processing device 50. The bay battery detection signal of the terminal SW/T+, which outputs the battery detection signal from the bay battery 4, however, remains to be "H" (ST12). That is, the bay battery detection signal indicates that the bay battery 4 is not yet connected. Accordingly, the bay battery detection signal 22 of the battery controller 10 is kept at the high electric potential H, while a status between the collector and the emitter of the transistor 28T remains connected. Further, the pull-down circuit within the bay projector 12 changes the bay projector detection signal 16 to the low electric potential L from the high electric potential H via a signal terminal SC#/T− and the branch portion (branch line) of the signal line 17B of the battery connector 6, thus conveying the connection of the bay projector 12 to the GPIO controller 18. As a result, the BIOS recognizes the connection of the bay projector 12 (ST13). Note that when the terminal SW/T+ outputting the battery detection signal from the bay battery 4 is at the high electric potential H, the SC#/T− signal terminal 26A of the battery controller 10 comes to the status of the high electric potential H by the built-in pull-up circuit 31. Herein, it is assumed that when the bay battery detection signal is at the high electric potential H, the logic output circuit 28 in FIG. 8 outputs the low electric potential L. Accordingly, if the bay battery 4 is not yet connected, the SC#/T− signal terminal 26A does not affect the bay projector detection signal 16 inputted to the bay projector detection signal terminal 16A of the GPIO controller 18.

The BIOS, upon recognizing the connection of the bay projector 12, connects the switch 13 to the USB controller sided terminal 19 by the switch control GPIO signal 25 (ST14). Consequently, the terminal S7 (the ground terminal) of the SATA connector 5 is connected to the terminal USB+ of the USB controller 14, and the terminal P4 (the terminal MD) is connected to the terminal USB− thereof. Furthermore, the BIOS performs the power activation on the bay (ST15).

Thereupon, a recognition process starts between the information processing device 50 and the bay projector 12. When executing the recognition process starts between the information processing device 50 and the bay projector 12, the information processing device 50 connects the bay projector 12 via the SATA connector 5. More specifically, the CPU 71 is enabled to transmit the data to the bay projector via the switch 13 and the SATA connector 5 through the terminals USB+ and USB− of the USB controller 14. Moreover, the CPU 71 outputs the brightness control GPIO signal 21 of the GPIO controller 18 to the bay projector 12 via the terminal S1, whereby the brightness can be controlled. As a result, the user gets enabled to use the bay projector 12 (ST16).

Next, a presumption is that the user will have extracted the bay projector 12 from the bay structure 1 (ST17). Because of the non-connection of the pull-down circuit within the bay projector 12, the high electric potential H is inputted to the bay projector detection signal terminal 16A of the GPIO controller 18 via the external pull-up resistance 27. Namely, the bay projector detection signal 16 of the GPIO controller 18 changes to the high electric potential H from the low electric potential L. As a consequence, the BIOS recognizes the non-connection of the bay projector 12 (ST18). Then, the BIOS switches OFF (shutdown status) the switch 13 by the switch control GPIO signal 25 (ST19). Further, the BIOS cuts OFF the bay power supply (ST1A). Consequently, the information processing device 50 returns to the status of ST0.

Figure 11:
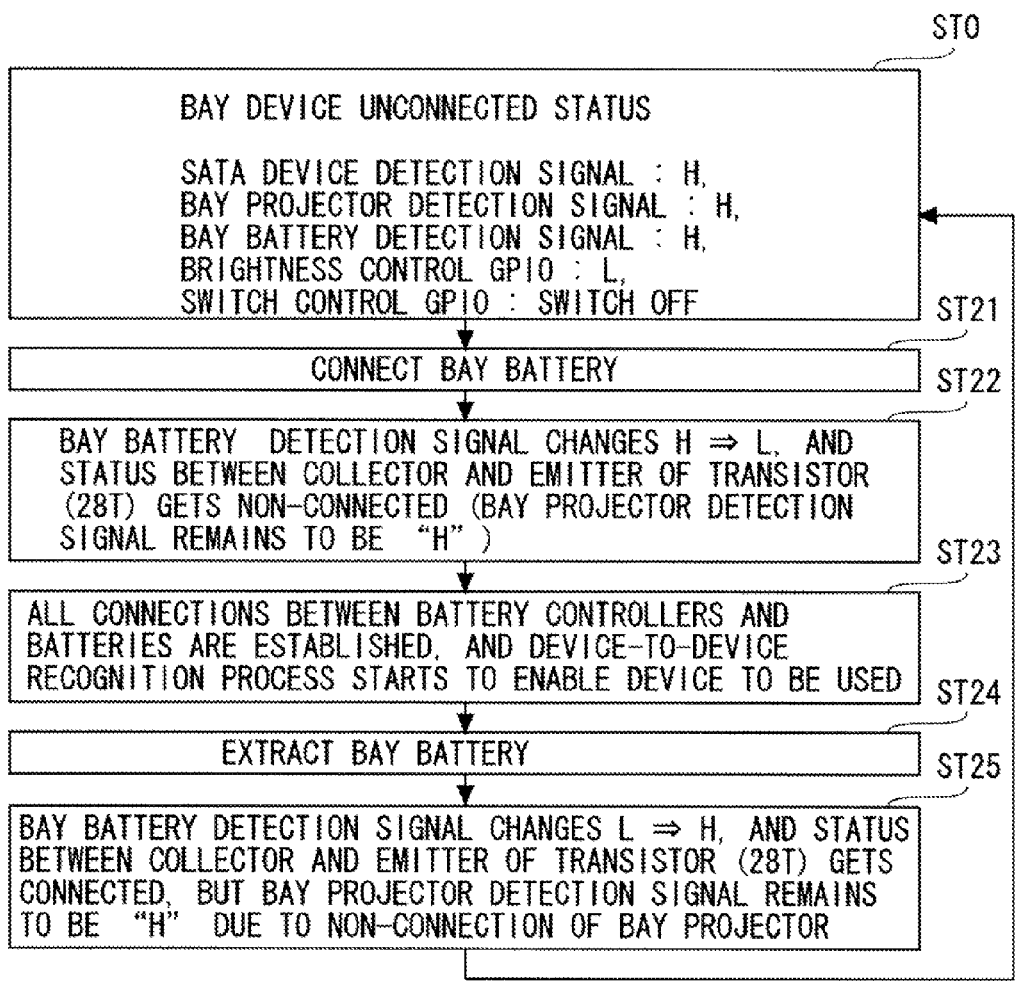
FIG. 11 is a flowchart illustrating processes of the information processing device in the case of connecting a bay battery.

FIG. 11 illustrates processes of the information processing device 50 in the case of connecting the bay battery 4 through the bay structure 1. The status of ST0 in FIG. 11 is the same as in the case of FIG. 10. In this status, it is assumed that the user will have inserted the bay battery 4 into the bay structure 1 in order to connect the bay battery 4 to the information processing device 50. Hereupon, the connection between the bay battery 4 and the information processing device 50 is established via the battery connector 6 (ST21). Then, with the pull-down circuit in the bay battery 4, the bay battery detection signal of the terminal SW/T+ changes to the low electric potential L from the high electric potential H. Subsequently, the battery controller 10 sets the bay battery detection signal 22 to the low electric potential L. Thereupon, the status between the collector and the emitter of the transistor 28T becomes non-connected. Accordingly, the high electric potential H is kept at the bay projector detection signal terminal 16A of the GPIO controller 18 via the external pull-up resistance 27, and the bay projector detection signal 16 remains to be "H" (ST22). Further, the connection between the battery controller 10 and the bay battery 4 is established, and the recognition process starts between the information processing device 50 and the bay battery 4. The bay battery 4 can be used, e.g., the power can be supplied to the information processing device 50 from the bay battery 4 (ST23).

Next, it is presumed that the user will have extracted the bay battery 4 (ST24). Thereupon, the bay battery detection signal of the terminal SW/T+ changes to the high electric potential H from the low electric potential L. Therefore, the battery controller 10 sets the bay battery detection signal 22 to the high electric potential H, and hence the status between the collector and the emitter of the transistor 28T becomes connected. Due to the non-connection of the bay projector 12 also, however, the bay projector detection signal 16 remains to be the high electric potential H via the external pull-up resistance 27 (ST25). As a result, the information processing device 50 returns to the status of ST0.

As described according to FIG. 10, in the information processing device 50 including the battery connector 6 capable of connecting the bay battery 4, with the terminal SW/T+ of the battery connector 6, as a result of the non-connection of the bay battery 4, the battery controller 10 sets the bay battery detection signal 22 to the high electric potential H. Then, the transistor 28T is switched ON. As a consequence, the bay projector detection signal 16 set to the low electric potential L from the status of the high electric potential H which is pulled up by the external pull-up resistance, is inputted to the bay projector detection signal terminal 16A of the GPIO controller 18 via the terminal SC#/T− of the battery connector 6 from the pull-down circuit within the bay projector 12. Accordingly, the GPIO controller 18 can detect the connection of not the bay battery 4 but the bay projector 12. In this case, the SC#/T− signal terminal 26A of the battery controller 10 is originally connected to the terminal SC#/T− of the battery connector 6 via the branch line. As depicted in FIG. 8, however, the SC#/T− signal terminal 26A of the battery controller 10 becomes the status of the high electric potential H in the non-connected status of the bay battery. Each of resistance constants of the pull-up resistance of the built-in pull-up circuit 31 and the external pull-up resistance 27 is, however, well larger than the resistance constant of the pull-down resistance within the bay projector 12, and hence, when the bay projector 12 is attached to the bay structure 1, the pull-down resistance within the bay projector 12 overcomes the pull-up resistance of the built-in pull-up circuit 31 and the external pull-up resistance 27.

Moreover, the detection result of the GPIO controller 18 is transmitted to the BIOS through the CPU 71. Then, the BIOS switches over the switch 13 by the switch control GPIO signal 25, thereby connecting the terminal S7 and the terminal P4 of the SATA connector 5 to the terminals USB+ and USB− of the USB controller. Accordingly, the bay projector 12 is provided with the SATA connector 5B on the side of the bay projector 12, which can be connected to the host-sided SATA connector 5A, thereby enabling the data to be transmitted and received between the information processing device 50 and the bay projector 12 via the SATA connector 5 and the USB controller 14. Further, the terminal S1 of the SATA connector 5B on the side of the bay projector 12 is connected to a circuit for receiving the brightness control GPIO signal 21 within the bay projector 12, whereby the brightness control GPIO signal 21 of the GPIO controller 18 can be transmitted to the bay projector 12 via the SATA connector 5.

As described above, according to the information processing device 50 in the first working example, in the bay structure 1 including the battery connector 6, in the status where the battery controller 10 can not detect the bay battery 4 through the battery connector 6, the equipment other than the bay battery 4, i.e., the bay projector 12 can be detected by the switch such as the transistor 28T in a way that makes the use of setting the bay battery detection signal 22 to "H". It does not, however, mean that the detection target equipment is limited to the bay projector 12.

Further, according to what has been discussed so far, the battery controller 10 detects the connection or the non-connection of the bay battery 4 from whether pulled down or not through the terminal SW/T+. To be specific, for generating the bay projector detection signal 16, the bay projector detection signal terminal 16A of the GPIO controller 18 is pulled up by the external resistance, while the interior of the bay projector 12 is provided with the pull-down circuit connected via the terminal SW/T+ of the battery connector 6. It does not, however, mean that the connection and the non-connection of the bay projector 12 are restricted to the pull-down based signals in the processes of the information processing device 50. For example, the GPIO controller 18 may detect the connection and the non-connection of the bay projector 12 on the basis of the signals coming from, conversely, the pull-up circuit. In this case, it may be sufficient that the bay projector detection signal terminal 16A of the GPIO controller 18 is pulled down by the external resistance.

Furthermore, according to what has been discussed so far, the transistor 28T enables the bay projector 12 to be detected by making the use of such an event that the battery controller 10 sets the bay battery detection signal 22 to "H" in a non-detected status of the bay battery 4 via the battery connector 6. In this case, an NPN-type bipolar transistor can be exemplified as the transistor 28T. Moreover, an N-channel MOS transistor may also be employed in place of the NPN-type bipolar transistor.

In the processes of the information processing device 50, however, the battery controller 10 may set the bay battery detection signal 22 to "L" in the non-detected status of the bay battery 4 via the battery connector 6. In this instance, a PNP-type bipolar transistor can be exemplified as the transistor 28T. Further, a P-channel MOS transistor may also be used as a substitute for the PNP-type bipolar transistor.

Moreover, as described above, according to the information processing device 50 in the first working example, in the bay structure 1 including the SATA connector 5 and the battery connector 6, the battery controller 10 detects the connection or the non-connection of the bay battery 4 in a manner that depends on any one of the device non-connection signals, e.g., depends on whether pulled down or not via the terminal SW/T+ of the battery connector 6. Then, in accordance with the detection result thereof, for instance, the interface control unit such as the BIOS switches over the switch 13 by the switch control GPIO signal 25 in a way that employs the connection control device like the GPIO controller 18. That is, the GPIO controller 18, when detecting the connection of the bay projector 12 from the terminal SW/T+ of the battery connector 6, connects the divertible terminal S7 and the terminal P4.MD in the SATA connector 5 to the terminals USB+ and USB− of the USB controller 14 by use of the switch 13. On the other hand, the GPIO controller 18, when recognizing the connection of the SATA device via the terminal DP from the SATA connector 5, connects the terminal train of the SATA connector 5 to the SATA controller 8 by employing the switch 13.

The connection and the control such as this enable realization of the interface functioning in the same way as the USB interface between the bay projector 12 and the information processing device 50 through the SATA connector 5. Namely, the bay structure 1 can be provided newly with the interface equal to the USB owing to the combination of the existing SATA connector 5 and the existing battery connector 6. Alternatively, in the instance of the first working example, the combination of the existing SATA connector 5 and the existing battery connector 6 enables the realization of the new interface including the USB interface, the brightness control GPIO signal 21 and the device detection signal. Herein, the device detection signal is, e.g., the bay projector detection signal 16.

Furthermore, the bay structure 1 is provided with the SATA connector 5B and the battery connector 6B that are defined as the existing connectors, whereby the existing connectors of the bay structure 1 can be utilized for the equipment such as the bay projector 12 connected by the new interface.

<First Modified Example>

The first working example discussed above has exemplified the example of connecting the bay projector 12 by the SATA connector 5 and the battery connector 6. It does not, however, mean that the configuration of the information processing device 50 is limited to the combination of the SATA connector 5 and the battery connector 6. Moreover, it does not mean that the new equipment connected in place of the SATA device and the bay battery 4 is limited to the bay projector 12.

Figure 12:
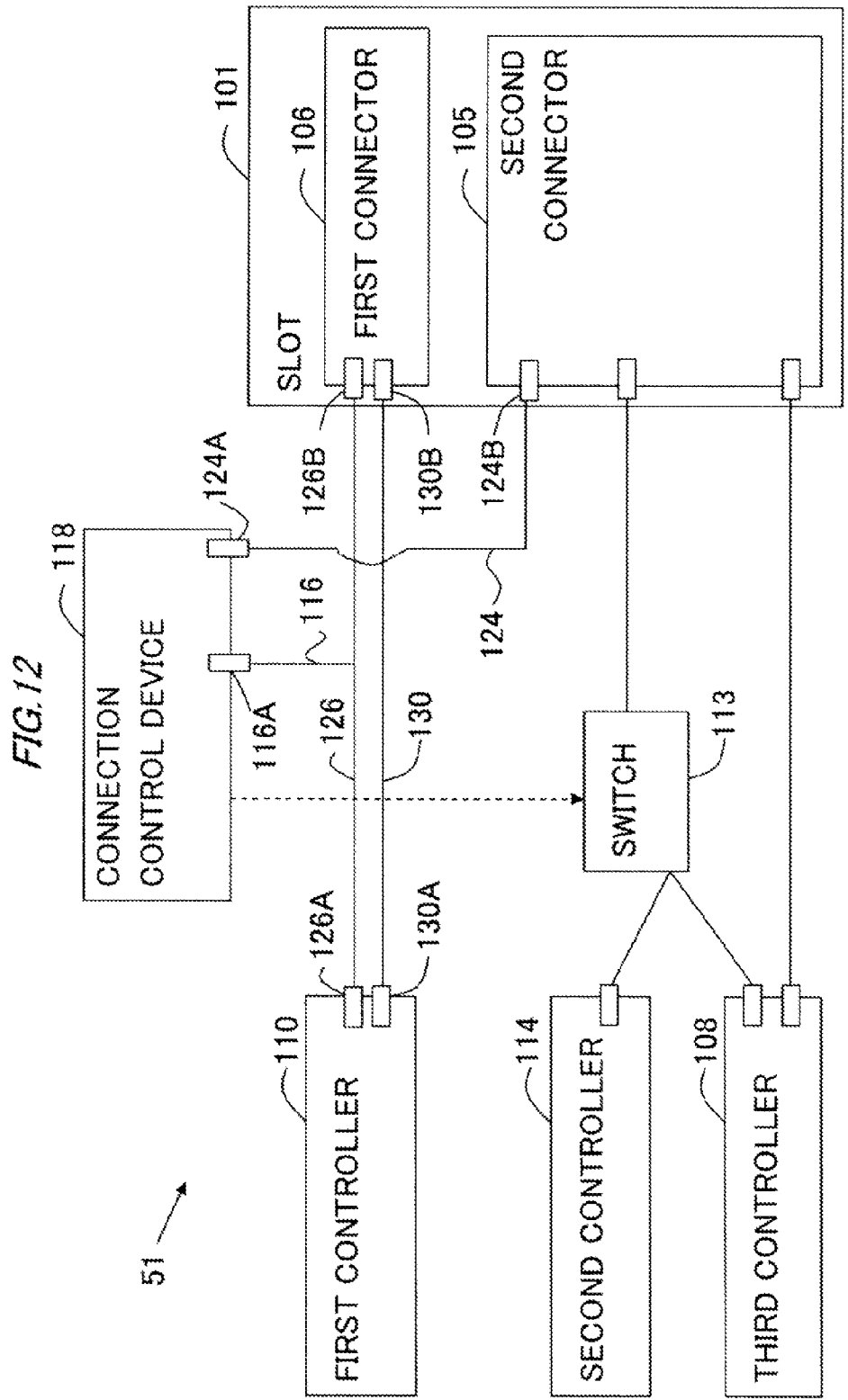
FIG. 12 is a diagram depicting configurations of the information processing device according to a first modified example and an interface with the equipment.

FIG. 12 illustrates a configuration of an information processing device 51 according to a first modified example. The information processing device 51 in FIG. 12 includes a slot 101, a first controller 110, a second controller 114, a third controller 108, a switch 113 and a connection control device 118.

An interior of the slot 101 is provided with a first connector 106 and a second connector 105. The first connector 106 is provided with a terminal train including a first detection terminal 126B and a first equipment connection status terminal 130B. A conduction path connected to the first detection terminal 126B branches off to connect with a first controller terminal 126A and with a second equipment detection terminal 116A of the connection control device 118. On the other hand, the first equipment connection status terminal 130B is connected to a first controller terminal 130A via a conductive path.

When the first equipment is connected to the slot 101, a detection signal is output to the first equipment connection status terminal 130B from the first equipment. The detection signal of the first equipment connection status terminal 130B is inputted to the first controller 110 via the terminal 130A. When the reception of the first equipment into the slot 101 is recognized from the detection signal coming from the first equipment connection status terminal 130B, the first controller 110 transmits and receives control signals containing a control signal 126 etc., which are output from the terminal 126A, via the first connector 106 to and from the first equipment, thus controlling the first equipment.

Further, when the second equipment is attached to the slot 101, a detection signal is not output to the first equipment connection status terminal 130B from the first equipment. Alternatively, the first controller 110 is disabled from recognizing the connection of the first equipment. The first controller 110, if disabled from recognizing the connection of the first equipment, sets the terminal 126A in the status of the high electric potential. Now, it is supposed that the second equipment can output the low electric potential to the first detection terminal 126B so as to change the statuses of the electric potentials of the terminal 126A and the second equipment detection terminal 116A. For example, the terminal 126A and the second equipment detection terminal 116A are pulled up respectively by the pull-down resistances, and the second equipment pulls down the first detection terminal 126B with the pull-down resistance of which a resistance value is lower than a parallel resistance value of the two pull-up resistances, in which case the signal of the low electric potential can be output from the first detection terminal 126B. Then, the connection control device 118 acquires the signal (the low electric potential) from the first detection terminal 126B through the second equipment detection terminal 116A. Accordingly, the second equipment detection signal, which is output by the second equipment, is transmitted to the connection control device 118, and the connection control device 118 recognizes the connection of the second equipment. Note that according to what has been discussed so far, there is exemplified the case in which the terminal 126A and the second equipment detection terminal 116A are pulled up by the pull-up resistances, while the second equipment pulls down the first detection terminal 126B. The pull-down and the pull-up may also, however, be reversed.

The second equipment includes a second equipment connector received by the first connector 106 and a fourth equipment connector received by the second connector. When attached into the slot 101, the second equipment is connected to the information processing device 51 via the first connector 106 and the second connector 105.

The connection control device 118, upon recognizing the connection of the second equipment, controls the switch 113 to connect at least a part of the terminal train of the second connector 105 to the second controller 114. As a result, the second controller 114 is connected to the second equipment through the switch 113 and the second connector 105. Therefore, the second controller 114 can control the second equipment.

On the other hand, the second connector 105 is provided with a terminal train including a second detection terminal 124B. The second detection terminal 124B is connected to a third equipment detection terminal 124A of the connection control device 118 through the conductive path. When the third equipment is attached to the slot 101 in place of the first equipment and the second equipment, the detection signal is transmitted via the second detection terminal 124B to the third equipment detection terminal 124A of the connection control device 118. The connection control device 118 recognizes the connection of the third equipment from the detection signal inputted to the third equipment detection terminal 124A.

The connection control device 118, upon recognizing the connection of the third equipment, controls the switch 113 to connect the second connector 105 to the third controller 108. As a consequence, the third controller 108 is connected to the third equipment via the switch 113 and the second connector 105. Accordingly, the third controller 108 can control the third equipment.

To be specific, the slot such as the bay structure 1 has already been provided with a single type or plural types of connectors, and a single type or plural types of interfaces are provided, in which case the same configuration as in the first working example can be applied.

The configuration described above enables the second equipment as an additional device to be employed by use of the first connector 106 for connecting the first equipment and the second connector 105 for connecting the third equipment within the slot 101.

<Second Modified Example>

The first working example has exemplified the example of connecting the bay projector 12 through the SATA connector 5 and the battery connector 6. It does not, however, mean that the configuration of the information processing device 50 is limited to the combination of the SATA connector 5 and the battery connector 6.

Figure 13:
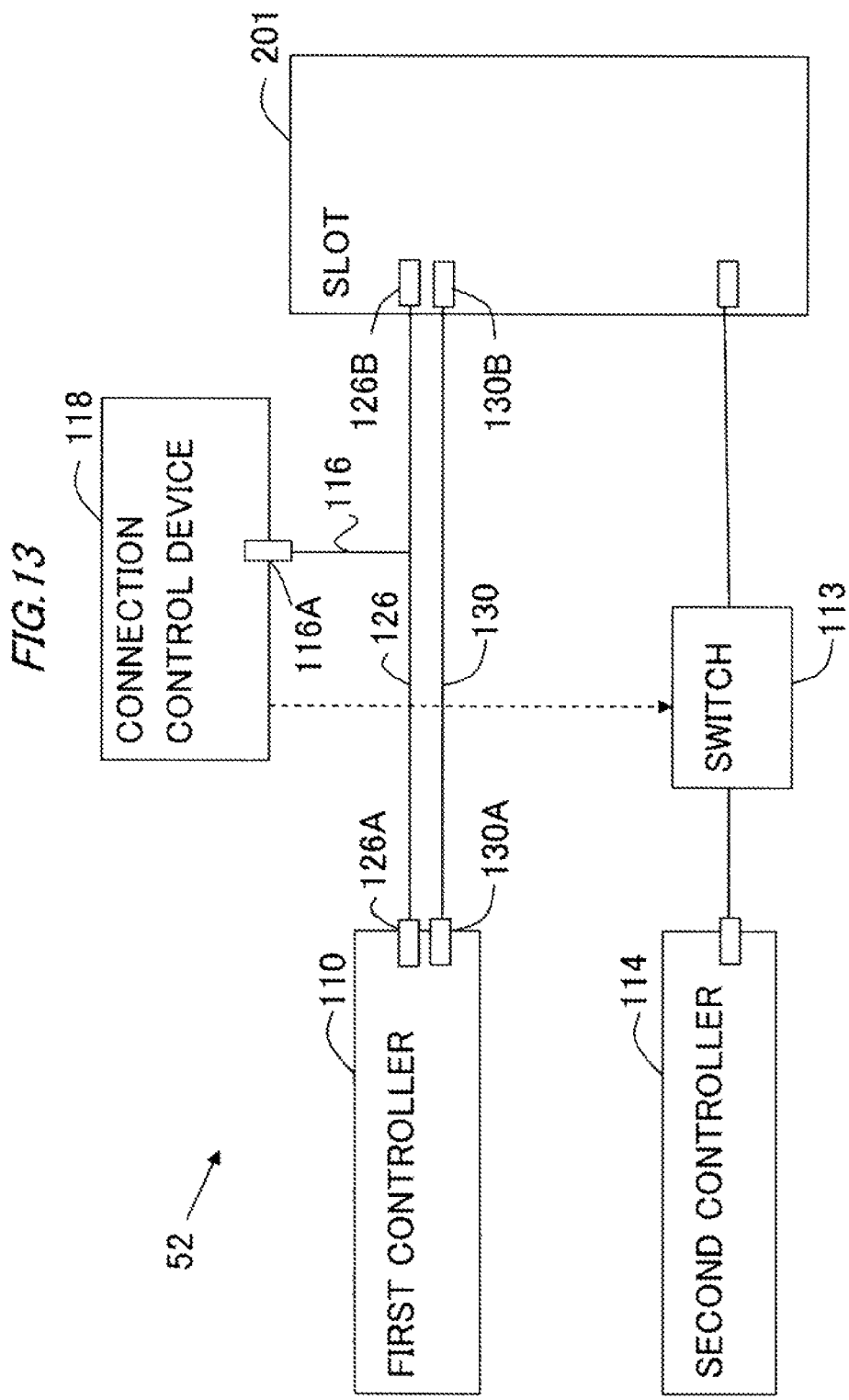
FIG. 13 is a diagram depicting configurations of the information processing device according to a second modified example and the interface with the equipment.

FIG. 13 illustrates a configuration of an information processing device 52 according to a second modified example. The information processing device 52 in FIG. 13 includes a slot 201, the first controller 110, the second controller 114, the switch 113 and the connection control device 118.

An interior of the slot 201 is provided with a terminal train including a first detection terminal 126B and a first equipment connection status terminal 130B. A conduction path connected to the first detection terminal 126B branches off to connect with the terminal 126A of the first controller 110 and with the second equipment detection terminal 116A of the connection control device 118. On the other hand, the first equipment connection status terminal 130B is connected via the conductive path to the terminal 130A of the first controller 110.

When the first equipment is connected to the slot 201, the detection signal is output from the first equipment to the first equipment connection status terminal 130B. The detection signal of the first equipment connection status terminal 130B is inputted via the terminal 130A to the first controller 110. When recognizing the reception of the first equipment to the slot 201 from the detection signal coming from the first equipment connection status terminal 130B, the first controller 110 transmits and receives the control signals containing the control signal 126 etc., which are output from the terminal 126A, to and from the first equipment, thus controlling the first equipment.

Further, when the second equipment is attached into the slot 201, the detection signal is not output to the first equipment connection status terminal 130B from the first equipment. Alternatively, the first controller 110 is disabled from recognizing the connection of the first equipment. The first controller 110, if disabled from recognizing the connection of the first equipment, sets the terminal 126A in the status of the high electric potential. Accordingly, in the same way as in the first modified example, the connection control device 118 acquires the signal from the first detection terminal 126B via the second equipment detection terminal 116A. Namely, the detection signal for getting the second equipment recognized, which is output by the second equipment, is transmitted to the connection control device 118, and the connection control device 118 recognizes the connection of the second equipment.

When the second equipment is attached into the slot 201, the second equipment is connected to the information processing device 52 via the terminal including the first detection terminal 126B. The connection control device 118, upon recognizing the connection of the second equipment, controls the switch 113 to connect at least a part of the terminal train within the slot 201 to the second controller 114. As a result, the second controller 114 is connected to the second equipment through the switch 113 and the slot 201. Therefore, the second controller 114 can control the second equipment.

The configuration described above enables the recognition of the reception of the second equipment as the additional device to the slot 201 by use of the first detection terminal 126B employed for connecting the first equipment within the slot 201, and also enables the second equipment to connect with the second controller 114.

According to the information processing device, an unimplemented interface can be added without adding a new terminal to the information processing device.

<Computer-Readable Recording Medium>

A program for making a computer, other machines and devices (which will hereinafter be referred to as the computer etc.) realize any one of the functions can be recorded on a recording medium readable by the computer etc. Then, the computer etc. is made to read and execute the program on this recording medium, whereby the function thereof can be provided.

Herein, the recording medium readable by the computer etc connotes a recording medium capable of accumulating information such as data and programs electrically, magnetically, optically, mechanically or by chemical action, which can be read from the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory, etc. are given as those removable from the computer. Further, a hard disc, a ROM (Read-Only Memory), etc. are given as the recording mediums fixed within the computer etc.

What is claimed is:

1. An information processing device, comprising:
a connector used for attaching first equipment or second equipment to the information processing device, the connector including a first terminal and a second terminal;
a first control device to be connected to the first equipment via the first terminal and the second terminal, and controlling, via the first terminal, the first equipment and detecting, via the second terminal, the first equipment when the first equipment is attached to the information processing device via the connector; and
a connection control device to detect via the first terminal a first detection signal indicating that the second equipment is attached to the information processing device when the second equipment is attached to the information processing device via the connector.

2. The information processing device according to claim 1, wherein the first control device includes a circuit to provide a predetermined electric potential to the first terminal when the first equipment is not connected to the first control device, potential of the first terminal being changeable from the predetermined electric potential to a potential caused by the first detection signal.

3. The information processing device according to claim 2, wherein the connector includes a first connector which includes the first terminal and which receives a first equipment connector of the first equipment and a second connector which receives a third equipment connector of third equipment, and
the information processing device further comprises
a second control device to be connected to the second equipment via the first connector;
a third control device to be connected to the third equipment via the second connector; and
a switch to switch over a connecting destination of at least a part of terminals of the second connector between the second control device and the third control device.

4. The information processing device according to claim 3, wherein the second equipment is provided with a second equipment connector receivable by the first connector and a fourth equipment connector receivable by the second connector, and when the second equipment is attached to the information processing device, the first connector receives the second equipment connector and the second connector receives the fourth equipment connector.

5. The information processing device according to claim 3, wherein the second connector includes a third terminal to which a second detection signal is output from the third equipment when the second connector receives the third equipment connector, wherein the connection control device connects at least a part of the terminals of the second connector via the switch to the second control device when the second terminal outputs the first detection signal from the second equipment, and connects the second connector to the third control device via the switch when the third terminal outputs the second detection signal from the third equipment.

6. The information processing device according to claim 3, wherein a ground conductive path of the first connector has a larger conductance than a conductance of a ground conductive path of the second connector.

7. An equipment connection method using a connector including a first terminal and a second terminal, the equipment connection method comprising:

detecting first equipment via the second terminal when the first equipment is attached to a computer via the connector; and
detecting a first detection signal indicating that second equipment is attached to the computer via the first terminal used for controlling the first equipment when the second equipment is attached to the computer via the connector.

8. The equipment connection method according to claim 7, wherein the computer further sets a circuit of the first control device connected to the first terminal to a predetermined electric potential when the first equipment is not connected to the first control device, the potential of the first terminal being changeable from the predetermined electric potential to a potential caused by the first detection signal.

9. The equipment connection method according to claim 7, wherein the computer further includes a connector to connect third equipment to a third control device, and
the equipment connection method further comprises
detecting a second detection signal indicating that the third equipment is attached to the computer via a third terminal to which the second detection signal is output from the third equipment;
connecting at least a part of the terminals of the connector to a second control device to be connected to the second equipment via the connector when the first terminal outputs the first detection signal from the second equipment; and
connecting all of the terminals of the connector to the third control device when the third terminal outputs the second detection signal from the third equipment.

10. A non-transitory machine-readable storage medium storing a program of instructions, upon executing the instructions, the program causing a computer to perform:
detecting, when first equipment is attached to a computer via a connector including a first terminal and a second terminal, the first equipment via the second terminal; and
detecting a first detection signal indicating that second equipment is attached to the computer via the first terminal used for controlling the first equipment when the second equipment is attached to the computer via the connector.

11. The non-transitory machine-readable storage medium storing the program according to claim 10, wherein the program further causes the computer to set a circuit of the first control device connected to the first terminal to a predetermined electric potential when the first equipment is not connected to the first control device, the potential of the first terminal being changeable from the predetermined electric potential to a potential caused by the first detection signal.

12. The non-transitory machine-readable storage medium storing the program according to claim 10, wherein the computer further includes a connector to connect third equipment to a third control device, and
the program causes the computer further execute
detecting a second detection signal indicating that the third equipment is attached to the computer via a third terminal to which the second detection signal is output from the third equipment;
connecting at least a part of the terminals of the connector to a second control device to be connected to the second equipment via the connector when the first terminal outputs the first detection signal from the second equipment; and connecting all of the terminals of the connector to the third control device when the third terminal outputs the second detection signal from the third equipment.

\* \* \* \* \*